US009861162B2

(12) United States Patent
Kilgore

(10) Patent No.: US 9,861,162 B2
(45) Date of Patent: Jan. 9, 2018

(54) COMPONENTS FOR ARTICLES OF FOOTWEAR INCLUDING LIGHTWEIGHT, SELECTIVELY SUPPORTED TEXTILE COMPONENTS

(71) Applicant: NIKE, Inc., Beaverton, OR (US)

(72) Inventor: Bruce Kilgore, Lake Oswego, OR (US)

(73) Assignee: NIKE, Inc., Beaverton, OR (US)

(*) Notice: Subject to any disclaimer, the term of this patent is extended or adjusted under 35 U.S.C. 154(b) by 125 days.

(21) Appl. No.: 14/247,981

(22) Filed: Apr. 8, 2014

(65) Prior Publication Data

US 2015/0282565 A1    Oct. 8, 2015

(51) Int. Cl.
| | | |
|---|---|---|
| A43B 23/00 | (2006.01) |
| A43B 23/22 | (2006.01) |
| B05D 3/02 | (2006.01) |
| A43B 1/04 | (2006.01) |
| A43B 23/02 | (2006.01) |
| A43B 23/04 | (2006.01) |
| A43B 23/08 | (2006.01) |
| B29D 35/00 | (2010.01) |
| B29D 35/02 | (2010.01) |
| B29D 35/12 | (2010.01) |

(52) U.S. Cl.
CPC ............ *A43B 23/227* (2013.01); *A43B 1/04* (2013.01); *A43B 23/0205* (2013.01); *A43B 23/0235* (2013.01); *A43B 23/04* (2013.01); *A43B 23/08* (2013.01); *B05D 3/0254* (2013.01); *B29D 35/0054* (2013.01); *B29D 35/02* (2013.01); *B29D 35/126* (2013.01)

(58) Field of Classification Search
CPC ......... A43B 23/227; A43B 1/04; A43B 23/08; A43B 23/0205; A43B 23/04; A43B 23/0235; A43B 23/0225; B05D 3/0254; B29D 35/02; B29D 35/054
See application file for complete search history.

(56) References Cited

U.S. PATENT DOCUMENTS

| | | |
|---|---|---|
| 182,253 A | 9/1876 | Wight |
| 234,163 A | 11/1880 | Amblee |
| 503,062 A | 8/1893 | Norwood |

(Continued)

FOREIGN PATENT DOCUMENTS

| | | |
|---|---|---|
| CA | 2000090 A1 | 4/1990 |
| CN | 2870531 Y | 2/2007 |

(Continued)

OTHER PUBLICATIONS

U.S. Appl. No. 14/030,020, filed Sep. 18, 2013 entitled "Auxetic Structures and Footwear Soles Having Auxetic Structures".

(Continued)

*Primary Examiner* — Jeremy R Pierce
(74) *Attorney, Agent, or Firm* — Shook, Hardy & Bacon L.L.P.

(57) ABSTRACT

Footwear components are made from lightweight textile structures (e.g., including circular knitted structures made from natural or synthetic fibers, such as socks or sock-type structures). The textile structures are selectively supported at various areas to provide desired local characteristics. Additional aspects relate to methods of making such components, precursors to such components, and articles of footwear containing such components.

6 Claims, 22 Drawing Sheets

(56) References Cited

U.S. PATENT DOCUMENTS

| | | | |
|---|---|---|---|
| 985,467 A | 2/1911 | Speer | |
| 1,002,393 A | 9/1911 | Hansen | |
| 1,155,087 A | 9/1915 | O'Connor | |
| 1,320,202 A | 10/1919 | Melville | |
| 1,385,647 A | 7/1921 | Strauss | |
| 1,733,733 A | 10/1929 | Hess | |
| 2,071,775 A | 2/1937 | Winnett | |
| 2,147,197 A | 2/1939 | Glidden | |
| 2,174,462 A | 9/1939 | Freeman et al. | |
| 2,251,468 A | 8/1941 | Smith | |
| 2,278,199 A | 3/1942 | Hoza | |
| 2,314,098 A | 3/1943 | McDonald | |
| 2,432,533 A | 12/1947 | Meyer | |
| 2,580,840 A | 1/1952 | Rogndal | |
| 2,641,004 A | 6/1953 | Whiting | |
| 2,963,722 A | 12/1960 | Stix | |
| 3,035,292 A * | 5/1962 | Heaton | A43B 23/16 12/146 D |
| 3,067,442 A | 12/1962 | Bialy et al. | |
| 3,237,227 A | 3/1966 | Bromfield | |
| 3,239,861 A * | 3/1966 | Langlais | A43D 11/00 12/146 D |
| 3,605,152 A * | 9/1971 | Becker | A43D 11/00 12/146 D |
| 3,626,532 A | 12/1971 | Smith | |
| 3,745,600 A | 7/1973 | Rubico et al. | |
| 3,757,436 A | 9/1973 | Winkler et al. | |
| 3,758,903 A | 9/1973 | Auberry et al. | |
| 3,760,445 A | 9/1973 | Hartshorn et al. | |
| 3,983,204 A | 9/1976 | Opinsky et al. | |
| 4,050,108 A | 9/1977 | Londner | |
| 4,187,619 A | 2/1980 | Gibbs | |
| 4,266,314 A | 5/1981 | Londner epouse Ours | |
| 4,272,850 A | 6/1981 | Rule et al. | |
| 4,333,193 A | 6/1982 | Bartneck et al. | |
| 4,338,696 A | 7/1982 | Bichet | |
| 4,340,626 A | 7/1982 | Rudy | |
| 4,484,398 A | 11/1984 | Goodwin et al. | |
| 4,494,266 A | 1/1985 | Bartneck et al. | |
| 4,508,582 A | 4/1985 | Fink | |
| 4,517,443 A | 5/1985 | Dollst | |
| 4,601,078 A | 7/1986 | Bertolaja | |
| 4,668,557 A | 5/1987 | Lakes | |
| 4,741,062 A | 5/1988 | Blanc et al. | |
| 4,756,098 A | 7/1988 | Boggia | |
| 4,785,558 A | 11/1988 | Shiomura | |
| 4,858,340 A | 8/1989 | Pasternak | |
| 4,899,412 A | 2/1990 | Ganon | |
| 4,967,492 A | 11/1990 | Rosen | |
| 4,999,931 A | 3/1991 | Vermeulen | |
| 5,060,402 A | 10/1991 | Rosen | |
| D339,459 S | 9/1993 | Yoshikawa et al. | |
| D344,170 S | 2/1994 | Acoff | |
| 5,345,638 A | 9/1994 | Nishida | |
| 5,351,352 A | 10/1994 | Chillemi | |
| 5,469,639 A | 11/1995 | Sessa | |
| 5,692,319 A | 12/1997 | Parker et al. | |
| 5,718,064 A | 2/1998 | Pyle | |
| 5,813,146 A | 9/1998 | Gutkowski et al. | |
| 5,909,945 A | 6/1999 | Noy | |
| 5,918,338 A | 7/1999 | Wong et al. | |
| D420,786 S | 2/2000 | Ramer et al. | |
| 6,052,921 A | 4/2000 | Oreck et al. | |
| 6,151,804 A | 11/2000 | Hieblinger et al. | |
| 6,178,662 B1 | 1/2001 | Legatzke | |
| 6,226,896 B1 | 5/2001 | Friton | |
| 6,286,233 B1 | 9/2001 | Gaither | |
| 6,357,146 B1 | 3/2002 | Wordsworth et al. | |
| 6,401,366 B2 | 6/2002 | Foxen et al. | |
| 6,412,593 B1 | 7/2002 | Jones | |
| 6,487,795 B1 | 12/2002 | Ellis, III | |
| 6,564,476 B1 | 5/2003 | Hernandez | |
| 6,670,029 B2 | 12/2003 | Norton et al. | |
| D487,614 S | 3/2004 | Le | |
| D488,916 S | 4/2004 | McClaskie | |
| 6,862,820 B2 | 3/2005 | Farys | |
| 7,010,872 B2 | 3/2006 | Pawlus et al. | |
| 7,120,957 B2 | 10/2006 | Blanc | |
| 7,132,032 B2 | 11/2006 | Tawney et al. | |
| 7,160,621 B2 | 1/2007 | Chaudhari et al. | |
| 7,252,870 B2 | 8/2007 | Anderson et al. | |
| 7,254,906 B2 | 8/2007 | Morris et al. | |
| 7,310,894 B1 | 12/2007 | Schwarzman et al. | |
| 7,350,321 B2 | 4/2008 | Soon et al. | |
| D571,543 S | 6/2008 | Sungadi | |
| 7,455,567 B2 | 11/2008 | Bentham et al. | |
| 7,487,602 B2 | 2/2009 | Berger et al. | |
| 7,546,698 B2 | 6/2009 | Meschter | |
| 7,562,470 B2 | 7/2009 | Keen | |
| 7,574,818 B2 | 8/2009 | Meschter | |
| D614,382 S | 4/2010 | Grenet et al. | |
| 7,770,307 B2 | 8/2010 | Meschter | |
| 7,793,435 B1 | 9/2010 | Ruth | |
| 7,814,852 B2 | 10/2010 | Meschter | |
| 7,827,703 B2 | 11/2010 | Geer et al. | |
| 7,849,609 B2 | 12/2010 | Edington et al. | |
| 7,870,681 B2 | 1/2011 | Meschter | |
| 7,870,682 B2 | 1/2011 | Meschter et al. | |
| 8,002,879 B2 | 8/2011 | Hook | |
| 8,065,818 B2 | 11/2011 | Greene et al. | |
| D653,844 S | 2/2012 | Smith | |
| 8,122,616 B2 | 2/2012 | Meschter et al. | |
| 8,132,340 B2 | 3/2012 | Meschter | |
| 8,151,490 B2 | 4/2012 | Sokolowski | |
| 8,186,078 B2 | 5/2012 | Avar et al. | |
| 8,196,316 B2 | 6/2012 | Cook et al. | |
| 8,220,072 B2 | 7/2012 | Dodd | |
| 8,225,530 B2 | 7/2012 | Sokolowski et al. | |
| 8,266,827 B2 | 9/2012 | Dojan et al. | |
| 8,276,294 B2 | 10/2012 | Polegato Moretti | |
| 8,277,719 B2 | 10/2012 | Alderson et al. | |
| 8,312,645 B2 | 11/2012 | Dojan et al. | |
| 8,312,646 B2 | 11/2012 | Meschter et al. | |
| 8,322,050 B2 | 12/2012 | Lubart | |
| 8,343,404 B2 | 1/2013 | Meli et al. | |
| 8,388,791 B2 | 3/2013 | Dojan et al. | |
| 8,418,380 B2 | 4/2013 | Dojan et al. | |
| 8,429,835 B2 | 4/2013 | Dojan et al. | |
| 8,448,474 B1 | 5/2013 | Tatler et al. | |
| 8,490,299 B2 | 7/2013 | Dua et al. | |
| 8,516,723 B2 | 8/2013 | Ferrigan et al. | |
| 8,544,197 B2 | 10/2013 | Spanks et al. | |
| 8,566,991 B2 | 10/2013 | Mueller | |
| 8,567,098 B2 | 10/2013 | Hsu | |
| 8,631,589 B2 | 1/2014 | Dojan | |
| 8,640,291 B2 | 2/2014 | Fleming et al. | |
| 8,661,564 B2 | 3/2014 | Dodd | |
| 8,732,982 B2 | 5/2014 | Sullivan et al. | |
| 8,757,038 B2 | 6/2014 | Siegismund | |
| D707,934 S | 7/2014 | Petrie | |
| D716,027 S | 10/2014 | Kirschner | |
| D717,034 S | 11/2014 | Bramani | |
| 8,961,733 B2 | 2/2015 | Dodd | |
| 2002/0166262 A1 | 11/2002 | Hernandez | |
| 2003/0066207 A1 | 4/2003 | Gaither | |
| 2003/0115679 A1 | 6/2003 | Morlacchi et al. | |
| 2004/0181972 A1 | 9/2004 | Csorba | |
| 2005/0055844 A1 | 3/2005 | Yu | |
| 2005/0115284 A1 | 6/2005 | Dua | |
| 2005/0282454 A1 | 12/2005 | Meschter et al. | |
| 2006/0048413 A1 | 3/2006 | Sokolowski et al. | |
| 2006/0059715 A1 | 3/2006 | Aveni | |
| 2006/0108044 A1 | 5/2006 | Matsumoto | |
| 2006/0117606 A1 | 6/2006 | Chen et al. | |
| 2007/0011914 A1 | 1/2007 | Keen et al. | |
| 2007/0022627 A1 | 2/2007 | Sokolowski et al. | |
| 2007/0213838 A1 | 9/2007 | Hengelmolen | |
| 2007/0240333 A1 | 10/2007 | Le et al. | |
| 2007/0271821 A1 | 11/2007 | Meschter | |
| 2007/0271822 A1 | 11/2007 | Meschter | |
| 2007/0271823 A1 | 11/2007 | Meschter | |
| 2008/0010854 A1 | 1/2008 | Sokolowski | |
| 2008/0011021 A1 | 1/2008 | Starbuck et al. | |
| 2008/0083138 A1 | 4/2008 | Lacorazza et al. | |

(56) References Cited

U.S. PATENT DOCUMENTS

| | | |
|---|---|---|
| 2008/0110049 A1 | 5/2008 | Sokolowski et al. |
| 2008/0127426 A1 | 6/2008 | Morlacchi et al. |
| 2008/0141469 A1 | 6/2008 | Park |
| 2008/0216357 A1 | 9/2008 | Fogg et al. |
| 2008/0250673 A1 | 10/2008 | Andrews et al. |
| 2008/0289214 A1 | 11/2008 | Aveni |
| 2009/0064536 A1 | 3/2009 | Klassen et al. |
| 2009/0064540 A1 | 3/2009 | Sokolowski et al. |
| 2009/0071041 A1 | 3/2009 | Hooper |
| 2009/0090027 A1 | 4/2009 | Baudouin |
| 2009/0119820 A1 | 5/2009 | Bentham et al. |
| 2009/0133287 A1 | 5/2009 | Meschter |
| 2009/0151195 A1 | 6/2009 | Forstrom et al. |
| 2009/0178301 A1 | 7/2009 | Dohan et al. |
| 2009/0183392 A1 | 7/2009 | Shane |
| 2009/0272007 A1 | 11/2009 | Beers et al. |
| 2009/0274882 A1 | 11/2009 | Chasser et al. |
| 2009/0276933 A1 | 11/2009 | Dodd |
| 2009/0277043 A1 | 11/2009 | Graser et al. |
| 2009/0307932 A1 | 12/2009 | Kirby et al. |
| 2010/0018075 A1 | 1/2010 | Meschter et al. |
| 2010/0029796 A1 | 2/2010 | Alderson et al. |
| 2010/0037483 A1 | 2/2010 | Meschter et al. |
| 2010/0043253 A1 | 2/2010 | Dojan et al. |
| 2010/0043255 A1 | 2/2010 | Trevino |
| 2010/0088928 A1 | 4/2010 | Sarantakos et al. |
| 2010/0095551 A1 | 4/2010 | Gupta et al. |
| 2010/0126041 A1 | 5/2010 | Francis |
| 2010/0139122 A1 | 6/2010 | Zanatta |
| 2010/0170117 A1 | 7/2010 | Kim |
| 2010/0236098 A1 | 9/2010 | Morgan |
| 2011/0005105 A1 | 1/2011 | Hong |
| 2011/0010964 A1 | 1/2011 | Hardy et al. |
| 2011/0099845 A1 | 5/2011 | Miller |
| 2011/0119956 A1 | 5/2011 | Borel et al. |
| 2011/0168313 A1 | 7/2011 | Ma et al. |
| 2011/0179668 A1 | 7/2011 | Fleming et al. |
| 2011/0192056 A1 | 8/2011 | Geser et al. |
| 2011/0192059 A1 | 8/2011 | Spanks et al. |
| 2011/0239486 A1 | 10/2011 | Berger et al. |
| 2011/0247237 A1 | 10/2011 | Jara et al. |
| 2011/0247240 A1 | 10/2011 | Eder et al. |
| 2011/0258876 A1 | 10/2011 | Baker et al. |
| 2011/0277349 A1 | 11/2011 | Kim |
| 2011/0308115 A1 | 12/2011 | Le et al. |
| 2012/0011744 A1 | 1/2012 | Bell et al. |
| 2012/0021167 A1 | 1/2012 | Plant |
| 2012/0023686 A1 | 2/2012 | Huffa et al. |
| 2012/0023778 A1 | 2/2012 | Dojan et al. |
| 2012/0023786 A1 | 2/2012 | Dojan |
| 2012/0055044 A1 | 3/2012 | Dojan et al. |
| 2012/0117826 A1 | 5/2012 | Jarvis |
| 2012/0124861 A1 | 5/2012 | Losani |
| 2012/0124865 A1 | 5/2012 | Opie et al. |
| 2012/0129416 A1 | 5/2012 | Anand et al. |
| 2012/0159810 A1 | 6/2012 | Klassen |
| 2012/0174432 A1 | 7/2012 | Peyton |
| 2012/0181896 A1 | 7/2012 | Kornbluh et al. |
| 2012/0198720 A1 | 8/2012 | Farris et al. |
| 2012/0198727 A1 | 8/2012 | Long |
| 2012/0210607 A1 | 8/2012 | Avar et al. |
| 2012/0227282 A1 | 9/2012 | Hawkinson et al. |
| 2012/0233878 A1 | 9/2012 | Hazenberg et al. |
| 2012/0233882 A1 | 9/2012 | Huffa et al. |
| 2012/0246973 A1 | 10/2012 | Dua |
| 2012/0255201 A1 | 10/2012 | Little |
| 2012/0266492 A1 | 10/2012 | Youngs et al. |
| 2012/0272550 A1 | 11/2012 | Parce |
| 2012/0315456 A1 | 12/2012 | Scarpa et al. |
| 2013/0000152 A1 | 1/2013 | Cooper et al. |
| 2013/0019500 A1 | 1/2013 | Greene |
| 2013/0025157 A1 | 1/2013 | Wan et al. |
| 2013/0071583 A1 | 3/2013 | Evans et al. |
| 2013/0081305 A1 | 4/2013 | Byrne |
| 2013/0104428 A1 | 5/2013 | O'Brien et al. |
| 2013/0160324 A1 | 6/2013 | Peyton et al. |
| 2013/0160328 A1 | 6/2013 | Hatfield et al. |
| 2013/0219636 A1 | 8/2013 | Dojan et al. |
| 2013/0239444 A1 | 9/2013 | Polegato Moretti |
| 2013/0269209 A1* | 10/2013 | Lang ............... A43B 23/0205 12/146 C |
| 2013/0276333 A1 | 10/2013 | Wawrousek et al. |
| 2013/0284732 A1 | 10/2013 | Van Schaftingen |
| 2013/0305465 A1 | 11/2013 | Siegismund |
| 2013/0305565 A1 | 11/2013 | Jones |
| 2013/0312284 A1 | 11/2013 | Berend et al. |
| 2013/0340288 A1 | 12/2013 | Baker et al. |
| 2014/0053311 A1 | 2/2014 | Nordstrom et al. |
| 2014/0053312 A1 | 2/2014 | Nordstrom et al. |
| 2014/0059734 A1 | 3/2014 | Toronjo |
| 2014/0059891 A1 | 3/2014 | Lin |
| 2014/0072964 A1 | 3/2014 | Gerardus Schampers et al. |
| 2014/0090271 A1 | 4/2014 | Hoffer et al. |
| 2014/0101816 A1 | 4/2014 | Toronjo |
| 2014/0157631 A1 | 6/2014 | Dodd |
| 2014/0165427 A1 | 6/2014 | Molyneux et al. |
| 2014/0173934 A1 | 6/2014 | Bell |
| 2014/0173938 A1 | 6/2014 | Beye et al. |
| 2014/0237850 A1 | 8/2014 | Hull |
| 2014/0245632 A1 | 9/2014 | Podhajny et al. |
| 2014/0260281 A1 | 9/2014 | Innes |
| 2014/0310892 A1 | 10/2014 | Miller |
| 2014/0317962 A1 | 10/2014 | Smith et al. |
| 2014/0373389 A1 | 12/2014 | Bruce |
| 2015/0013187 A1 | 1/2015 | Taniguchi et al. |
| 2015/0027001 A1 | 1/2015 | VanDernoot et al. |
| 2015/0075033 A1 | 3/2015 | Cross et al. |
| 2015/0075034 A1 | 3/2015 | Cross et al. |
| 2015/0121724 A1 | 5/2015 | Sung |
| 2015/0128449 A1 | 5/2015 | Lin et al. |
| 2015/0201707 A1 | 7/2015 | Bruce |
| 2015/0289592 A1 | 10/2015 | Song |

FOREIGN PATENT DOCUMENTS

| | | | |
|---|---|---|---|
| CN | 101677651 A | 3/2010 | |
| FR | 861723 A1 | 2/1941 | |
| GB | 566137 A | 12/1944 | |
| GB | 2147792 A | 5/1985 | |
| GB | 2307873 A * | 6/1997 | ........... A43B 1/0027 |
| GB | 2463446 A | 3/2010 | |
| JP | 2005143637 A | 6/2005 | |
| KR | 101165793 B1 | 7/2012 | |
| TW | 201231283 A | 8/2012 | |
| WO | 9003744 A1 | 4/1990 | |
| WO | 03022085 A2 | 3/2003 | |
| WO | WO 2004105530 A1 * | 12/2004 | ........... A43B 1/0027 |
| WO | 2007022338 A1 | 2/2007 | |
| WO | 2007052054 A1 | 5/2007 | |
| WO | 2012171911 A1 | 12/2012 | |
| WO | 2014187970 A1 | 11/2014 | |
| WO | 2015041796 A1 | 3/2015 | |
| WO | 2016007205 A1 | 1/2016 | |
| WO | 2016032626 A1 | 3/2016 | |

OTHER PUBLICATIONS

Notice of Allowance dated Apr. 1, 2016 in U.S. Appl. No. 14/030,002, 7 pages.

International Search Report and Written Opinion dated Mar. 18, 2016 in PCT Application No. PCTUS2015/066901.

International Search Report and Written Opinion dated Mar. 18, 2016 in PCT Application No. PCTUS2015/066913.

International Preliminary Report on Patentability dated Mar. 22, 2016 in PCT Application No. PCTUS2014/052038.

International Search Report and Written Opinion dated Mar. 18, 2016 in PCT Application No. PCTUS2015/066905.

International Search Report and Written Opinion dated Apr. 6, 2016 in PCT Application No. PCTUS2015/066883.

International Search Report and Written Opinion dated Apr. 6, 2016 in PCT Application No. PCTUS2015/066923.

(56) References Cited

OTHER PUBLICATIONS

International Search Report and Written Opinion dated Apr. 13, 2016 in PCT Application No. PCTUS2015/066895.
Non-Final Office Action dated Mar. 26, 2015 in U.S. Appl. No. 14/030,002, 33 pages.
Final Office Action dated Aug. 13, 2005 in U.S. Appl. No. 14/030,002, 30 pages.
Non-Final Office Action dated Jan. 14, 2016 in U.S. Appl. No. 14/247,941, 17 pages.
Non-Final Office Action dated Jan. 20, 2016 in U.S. Appl. No. 14/030,002, 30 pages.
International Search Report and Written Opinion dated Dec. 4, 2014 in PCT/US2014/052038, 13 pages.
International Search Report and Written Opinion dated Oct. 14, 2015 in PCT/US2015/038958, 14 pages.
International Search Report and Written Opinion dated Nov. 17, 2015 in PCT/US2015/040523, 13 pages.
Variation from Uniformity, Daniel, Oct. 15, 2012 https://spacesymmetrystructure.wordpress.com/2012/10/15/variation-from-uniformity/.
Final Office Action dated Aug. 19, 2016 in U.S. Appl. No. 14/247,941, 15 pages.
Non-final Office Action dated Jan. 25, 2017 in U.S. Appl. No. 14/937,586, 25 pages. (35 new refs).
International Search Report and Written Opinion dated Sep. 7, 2015 in International Patent Application No. PCT/US2015/024829, 12 pages.
International Search Report and Written Opinion dated Sep. 9, 2015 in International Patent Application No. PCT/US2015/024832, 10 pages.

* cited by examiner

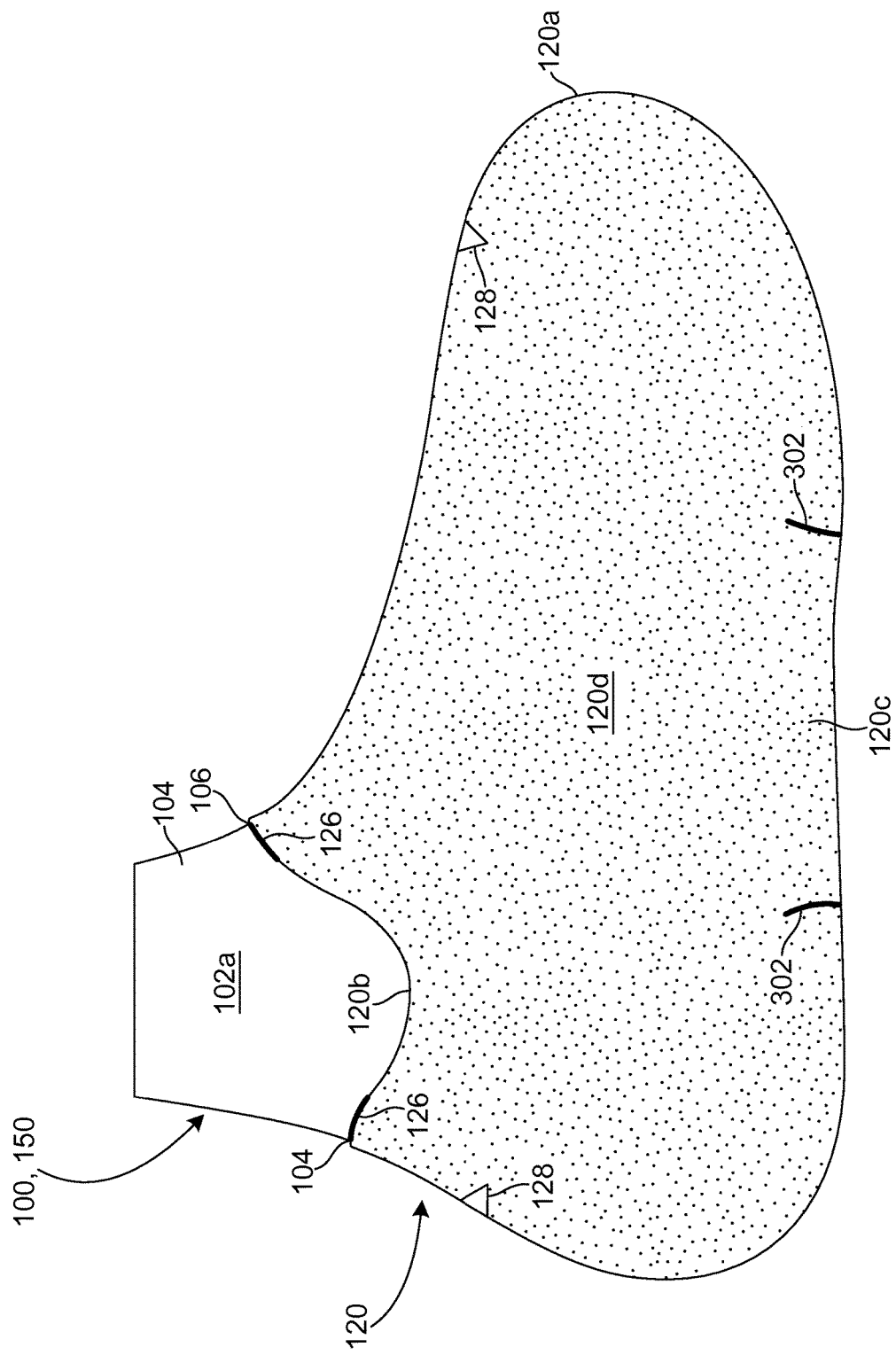

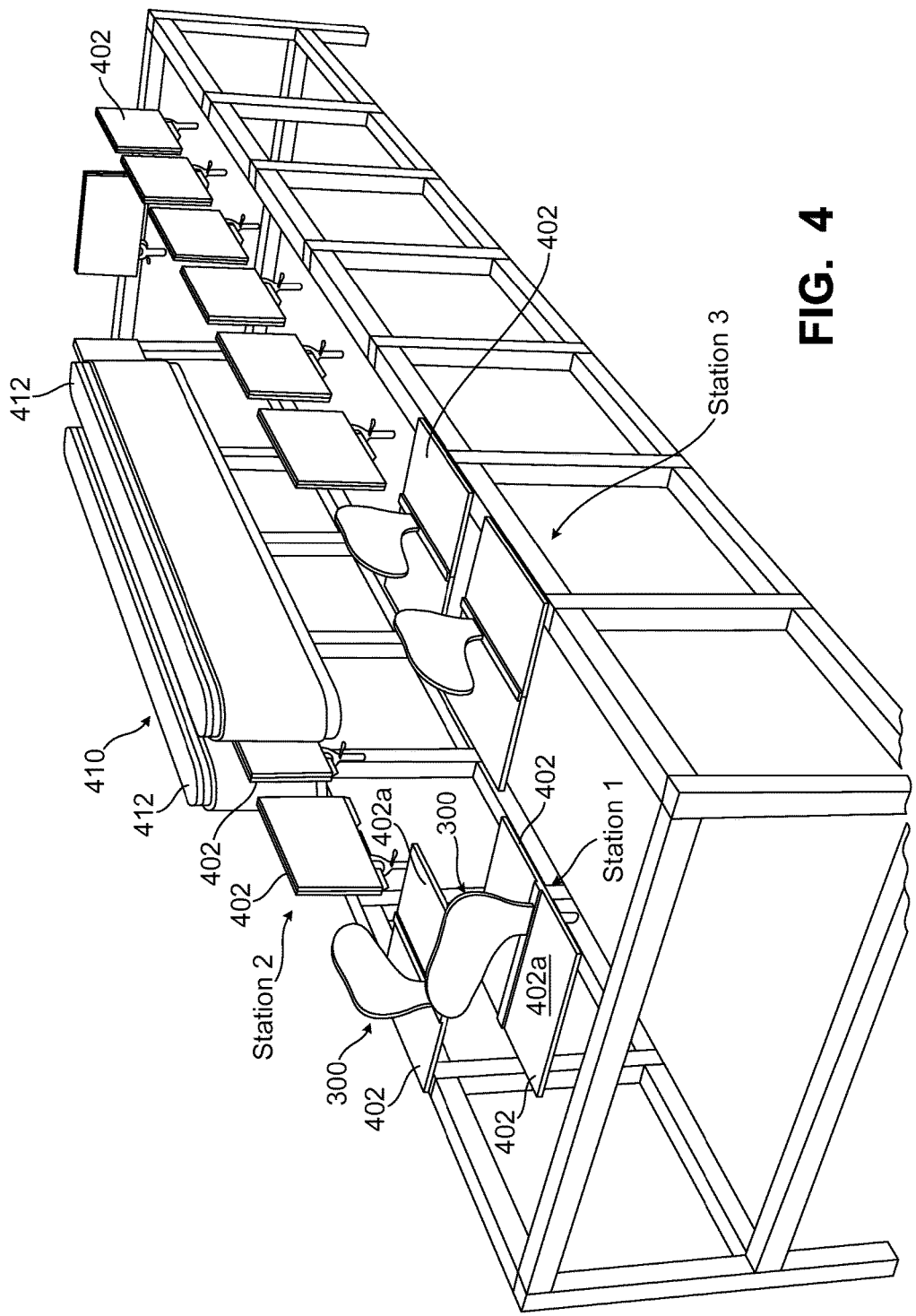

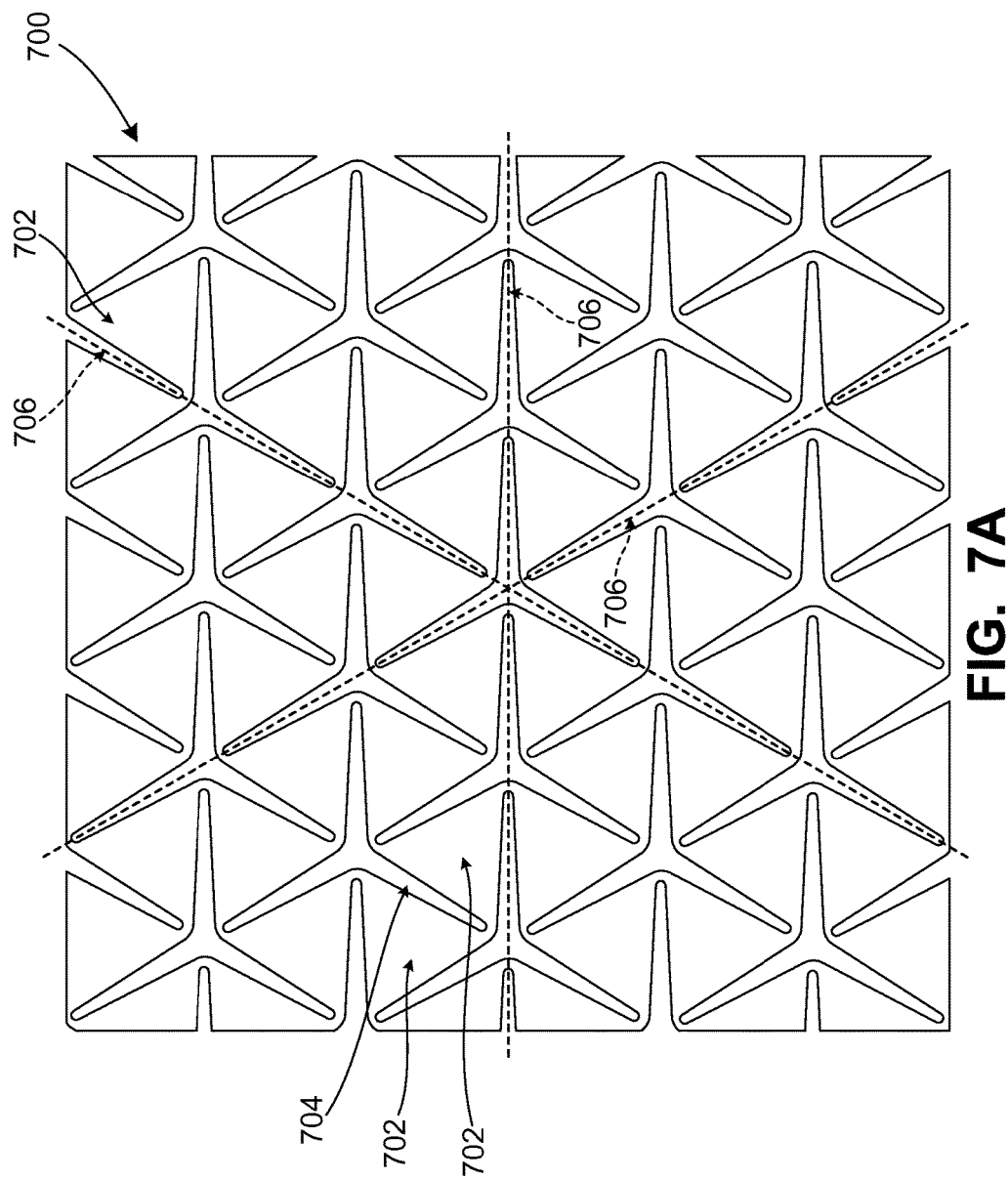

COMPONENTS FOR ARTICLES OF FOOTWEAR INCLUDING LIGHTWEIGHT, SELECTIVELY SUPPORTED TEXTILE COMPONENTS

FIELD OF THE INVENTION

Some aspects of the present invention relate to footwear components made from lightweight textile structures that are selectively supported at various areas to provide desired local characteristics. In some examples, the textile structure will be formed at least in part by a circular knitting process, and it may constitute a sock or sock-type structure. The textile structure may be selectively supported, for example, by a support member bonded to it and/or by a support material coated to or embedded within fibers of the textile structure. Additional aspects of this invention relate to precursors to these components, to articles of footwear including one or more of these selectively supported components, to methods of making these footwear components, to articles of footwear containing these components, and/or to methods of making such articles of footwear.

BACKGROUND

Conventional articles of athletic footwear include two primary elements, namely, an upper and a sole structure. The upper provides a covering for the foot that securely receives and positions the foot with respect to the sole structure. In addition, the upper may have a configuration that protects the foot and provides ventilation, thereby cooling the foot and removing perspiration. The sole structure is secured to a lower surface of the upper and generally is positioned between the foot and any contact surface. In addition to attenuating ground reaction forces and absorbing energy, the sole structure supports the foot and may provide traction and help control potentially harmful foot motion, such as over pronation. The general features and configurations of the upper and the sole structure are discussed in greater detail below.

The upper forms a void on the interior of the footwear for receiving the foot. The void has the general shape of the foot, and access to the void is provided at an ankle opening. Accordingly, the upper may extend over the instep and toe areas of the foot, along the medial and lateral sides of the foot, and around the heel area of the foot. A lacing system often is incorporated into the upper to allow selective changes to the size of the ankle opening and to permit the wearer to modify certain dimensions of the upper, particularly girth, to accommodate feet with varying proportions. In addition, the upper may include a tongue that extends under the lacing system to enhance the comfort of the footwear (e.g., to moderate pressure applied to the foot by the laces). The upper also may include a heel counter to limit or control movement of the heel.

The sole structure generally incorporates multiple layers that are conventionally referred to as an "insole," a "midsole," and an "outsole." The insole (which also may constitute a sock liner) is a thin member located within the upper and adjacent the plantar (lower) surface of the foot to enhance footwear comfort, e.g., to wick away moisture and provide a soft, comfortable feel. The midsole, which is traditionally attached to the upper along the entire length of the upper, forms the middle layer of the sole structure and serves a variety of purposes that include controlling foot motions and attenuating impact forces. The outsole forms the ground-contacting element of footwear and is usually fashioned from a durable, wear-resistant material that includes texturing or other features to improve traction.

While numerous footwear models and characteristics are available on the market, additional lightweight, form-fitting, and stable, shape maintaining footwear components (e.g., uppers) and methods of making them would be welcome advances in the art.

SUMMARY OF THE INVENTION

The following presents a general summary of aspects of the present invention in order to provide a basic understanding of the invention and various example features of it. This summary is not intended to limit the scope of the invention in any way, but it simply provides a general overview and context for the more detailed description that follows.

Aspects of this invention relate to footwear components made from lightweight textile structures (e.g., including circular knitted structures made from natural or synthetic fibers) that are selectively supported at various areas to provide desired local characteristics (such as stiffness or support), as well as to methods of making such components and articles of footwear containing such components. Additional aspects of this invention relate to uncured precursors to selectively supported footwear components and methods of incorporating such selectively supported components into footwear structures.

Some aspects of this invention will utilize and/or begin with an upper base member that defines a single foot-insertion opening and an otherwise enclosed volume (e.g., a sock or sock-like structure, optionally one produced by a circular knitting process and/or having one end closed off by a seam). Additionally, some aspects of this invention relate to footwear upper structures that are selectively supported (e.g., by pressed on support members or reactive polymeric materials, as will be described in more detail below) and may be incorporated into footwear structures in relatively easy and simple manners. More specifically, some aspects of this invention relate to footwear upper structures, e.g., of the types described above, that may be incorporated into a foot structure without the need for attachment of a strobel member, without the need for a bottom seam, and/or without the need for forming a heel stitch or other stitching, etc. Thus, the upper base member may be a continuous structure that extends uninterrupted around a plantar support surface of the foot (e.g., without a seam or strobel member under the foot). Such advantageous features of some examples of this invention can substantially reduce the time and/or labor involved in finally forming an upper and/or engaging an upper with a footwear sole structure.

BRIEF DESCRIPTION OF THE DRAWINGS

The present invention is illustrated by way of example and not limited in the accompanying figures, in which like reference numerals indicate the same or similar elements throughout, and in which:

FIGS. 1A-1C show various features and components used for pressing footwear components according to some examples of this invention;

FIG. 4 schematically illustrates an assembly line for pressing footwear components according to some examples of this invention;

FIGS. 7A-7D illustrate various features and steps for engaging a sole component with an upper base member in accordance with some examples of this invention.

Figure 1A:
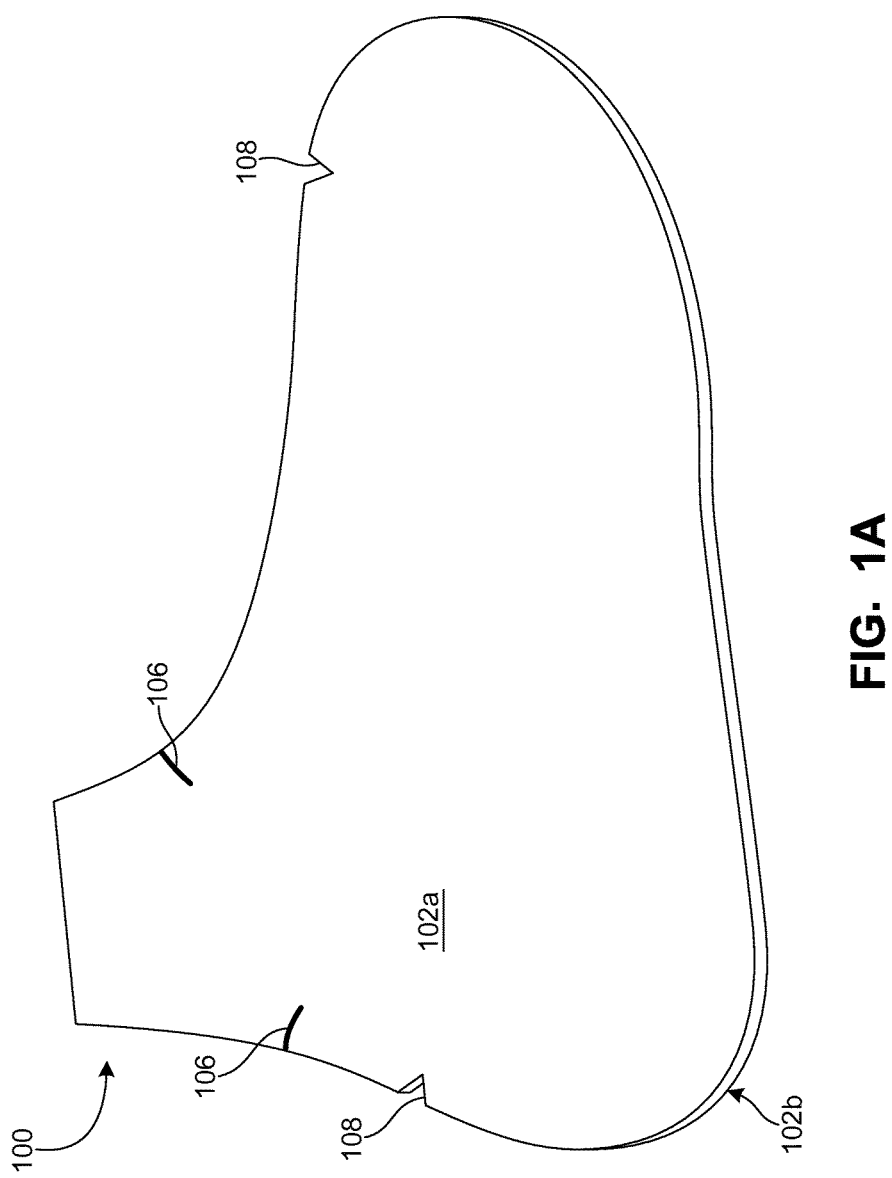

The reader is advised that the various parts shown in these drawings are not necessarily drawn to scale.

DETAILED DESCRIPTION

The following description and the accompanying figures describe various example features of footwear components, precursors thereof, articles of footwear, and methods in accordance with aspects of the present invention. When the same reference number appears in more than one drawing, that reference number is used consistently in this specification and the drawings to refer to the same or similar parts or elements throughout.

As noted above, some aspects of this invention relate to footwear components made from lightweight textile structures that are selectively supported at various areas to provide desired local characteristics, as well as to methods of making such components, precursors to these components, and products and/or methods that utilize these precursors and components. The following paragraphs generally describe detailed features of these aspects of the invention followed by some specific examples of structures and methods according to this invention.

I. GENERAL DESCRIPTION OF VARIOUS ASPECTS OF THIS INVENTION a. Pressed Footwear Components and Methods of Making them Including External Support Members Some aspects of this invention relate to methods of forming selectively supported upper components for articles of footwear. Some examples of these methods may include one or more of: (a) engaging an upper base member with a jig such that the upper base member surrounds a first portion of the jig, wherein the first portion of the jig is substantially flat and thin, e.g., having a substantially planar first surface, a substantially planar second surface opposite the first surface, and a thickness of less than 1 inch between the first and second surfaces (and in some examples, a thickness of less than ½ inch or less than ¼ inch); (b) positioning a first support member adjacent a surface of the upper base member such that the upper base member is located between the first support member and the jig, wherein a surface of the first support member adjacent the surface of the upper base member includes a bonding or adhesive material (e.g., a hot melt layer); (c) applying a compressive force to the first and second surfaces of the jig through the upper base member and the first support member; and/or (d) heating the assembly (e.g., the jig, upper base member, and first support member under the compressive force) so as to engage the first support member to the upper base member via the bonding or adhesive material.

In these example methods, the upper base member may constitute a continuous structure that includes a first side located adjacent the first surface of the jig and a second side located adjacent the second surface of the jig. In some more specific examples, the upper base member may be a circular knitted structure, optionally having an open end (through which the jig is inserted) and a closed end defining an enclosed volume, such as a conventional sock or a sock-type garment structure. The closed end of the circular knitted structure may be closed off by a sewn seam (e.g., akin to a conventional sock construction).

The first support member may be a continuous structure that includes a first side positioned adjacent the first side of the upper base member and a second side positioned adjacent the second side of the upper base member (e.g., wrapping around a bottom and extending along opposite sides of the sock and the jig, e.g., akin to a taco shell). Two or more support members may wrap around the bottom of a single upper base member and jig in this same manner, if desired.

Alternatively, if desired, the first support member may be located on a single side of the upper base member and/or the jig. Optionally, if desired, a second, separate support member (or even more support members) may be provided, located at the same side or the opposite side of the jig and upper base member from the first support member. The second support member, when present, may mirror the structure of the first support member (e.g., to provide similar support on the opposite side of the upper base member) or it may be structured and/or oriented to provide different support characteristics from the first support member.

While the support member(s) described above may have a wide variety of structures, constructions, and/or functions without departing from this invention, in some examples of this invention, the support member(s) may provide one or more of the following features: provide structural shape and/or support for at least some areas of the upper; provide impact force attenuation (e.g., include a midsole component); provide a ground contacting surface (e.g., include an outsole component); provide structures for engaging and/or supporting a shoe lace (e.g., one or more loops or eyelets; one or more inelastic bands, straps, or strands for supporting a lace and at least partially wrapping around the foot; etc.); provide wear and/or abrasion resistance or durability; provide water or moisture transmission resistance; provide adjustable and/or dynamic fit characteristics (e.g., one or more inelastic bands, straps, or strands at least partially wrapping around the foot to better fit the upper to the wearer's foot when the securing system is tightened); provide arch or plantar surface support; provide heel supports; provide desired colors and/or other aesthetics; etc. This support member may include one or more of a "skin" type material (e.g., made at least in part from a thermoplastic polyurethane); a textile material; a non-woven material; a suede or leather (natural or synthetic) material; an ethylvinylacetate ("EVA"), polyurethane, rubber, and/or other foam material; a spacer mesh material; etc. As some more specific examples, the support member may be of the types described in U.S. Pat. No. 8,429,835, which patent is entirely incorporated herein by reference (e.g., the "skin" and/or other material layers described in that patent).

In some examples of this invention, the heating step will include heating the jig, e.g., by inductive heating; using one or more resistor elements (such as flat resistors engaged with and/or recessed into the flat surface of the jig), which in turn will heat the bonding or adhesive material on the support member(s) through the upper base member (e.g., from the "inside" of the sock or sock-type structure); etc. Other heating methods also may be used, such as conductive or convective heating, ultrasonic heating, welding, hot press or hot die heating, laser heating, etc.

b. Engaging Support Components by Heating Through Footwear Upper Base Members

Some aspects of this invention relate to engaging footwear support components (e.g., of the types described above) with footwear upper base members (e.g., of the types described above) by transferring heat to the support component(s) through the material of the upper base member. Such methods may include one or more of: (a) positioning a support base in contact with a first surface of an upper base member (e.g., an interior surface of the upper base member); (b) positioning one or more support members adjacent a second surface of the upper base member (e.g., an exterior surface of the upper base member) such that the upper base member (optionally a single layer thereof) is located between the support member(s) and the support base, wherein at least a portion of a surface of the support member(s) adjacent the second surface of the upper base member includes a bonding or adhesive material (e.g., a hot melt adhesive material layer or coating); (c) applying a compressive force to hold at least a portion of the upper base member in place between the support member(s) and the support base; and/or (d) heating the support base so as to transfer heat from the support base to the support member(s) through the upper base member material and so as to engage the support member(s) to the upper base member via the bonding or adhesive material. For upper base members having a circular knitted, sock, and/or sock-type structure, this heating may take place from the "inside" of the upper base member (with the support member(s) including the bonding or adhesive material located at the outside of the upper base member and separated from the heat source by the material of the upper base member).

Heating through the material of the upper base member in this manner helps pull the bonding or adhesive material on the support member(s) into the structure of the upper base member (e.g., into the textile structure, such as into interstitial spaces between fibers of the textile and/or onto the fibers). This type of heat transfer may take place in pressing methods (e.g., flat press processing methods) described above or in other methods (e.g., processes using three dimension pressure, vacuum pressure, etc.). The heating may occur in any desired manner, such as by inductive heating, by activating heat elements, etc.

c. Localized and Selective Support of Footwear Components Using Reactive Polymeric Materials Some aspects of this invention relate to still other methods of forming components for articles of footwear including localized and selective support features. Such methods may include one or more of: (a) applying a reactive polymeric material (optionally as an aqueous solution) to one or more portions of an upper base member, wherein the reactive polymeric material exhibits thermoplastic properties as long as it is not exposed to curing conditions and thermosetting properties after it is exposed to curing conditions; and/or (b) exposing the reactive polymeric material on one or more portions of the upper base member to curing conditions (e.g., heating, optionally using heat and pressure to shape the upper base member) after the reactive polymeric material is applied to the upper base member so as to convert the reactive polymeric material at the selected portion(s) of the upper base member to a thermoset condition. If desired, the upper base member may include a textile component to which the reactive polymeric material is applied. In some more specific examples, the upper base member may be a circular knitted structure, optionally having an open end (through which a two or three dimensional support base may be inserted) and a closed end to thereby define an enclosed volume, such as a sock or a sock-type garment structure, and the reactive polymeric material may be applied at least to an outer or exterior surface of this upper base member. Alternatively or additionally, if desired, reactive polymeric material may be applied to an inner or interior surface of the upper base member and/or may be applied so as to soak into and/or through the material of the upper base member.

Some example methods according to this aspect of the invention will include methods of forming components for articles of footwear that include one or more of: (a) applying a first reactive polymeric material to a first portion of an upper base member (e.g., of the types described above), wherein the first reactive polymeric material exhibits thermoplastic properties as long as it is not exposed to curing conditions and thermosetting properties after it is exposed to curing conditions; (b) applying a second reactive polymeric material (which may be the same as or different from the first reactive polymeric material) to a second portion of the upper base member, wherein the second reactive polymeric material exhibits thermoplastic properties as long as it is not exposed to curing conditions and thermosetting properties after it is exposed to curing conditions; and (c) exposing the first and second reactive polymeric materials (simultaneously or separately) to curing conditions so as to convert the first and second reactive polymeric materials to thermoset conditions.

If desired, features of the first and second reactive polymeric materials and/or their application to the upper base member may be selected so as to provide different hardness and/or stiffness characteristics (or other characteristics) to the final footwear component product. As one more specific example, the first reactive polymeric material may include a first solution of a reactive polymer at a first concentration and the second reactive polymeric material may include a second solution of the reactive polymer at a second concentration that differs from the first concentration. As another example, in the steps of applying the first and second reactive polymeric materials, the first and second reactive polymeric materials may be applied to the upper base member at different application density levels (e.g., the first reactive polymeric material may be applied to at least some part of the first portion of the upper base member at an application density level greater than a first application density level and the second reactive polymeric material may be applied to at least some part of the second portion of the upper base member at an application density level lower than the first application density level). The term "application density level," as used herein, means an amount of reactive polymeric material (e.g., in grams) applied to a unit area (e.g., $cm^2$) and/or to a unit volume ($cm^3$) of an upper base member.

If desired, the final footwear component produced by these methods may have both cured and uncured reactive polymeric material(s) in or on it. In other words, a greater proportion of the upper base member surface or volume (including the entire upper base member surface or volume) may have reactive polymeric material initially applied to it than the proportion thereof having reactive polymeric material that is eventually cured. As a more specific example, the reactive polymeric material(s) may be applied to at least 50% of a total surface area or total volume of the upper base member (e.g., by coating or spraying) and then only one or more selected portions of this surface area or volume (e.g., less than 50% of the total surface area or volume) then will be exposed to the curing conditions. The "uncured" reactive polymeric material remaining may be cured in a later step, if desired. Methods according to some examples of this aspect of the invention may accomplish this "selective exposure" in various ways, such as: by applying an insulative "mask" over areas of the surface at which curing is not desired (so that insufficient heat transfers through the insulative mask to cure any reactive polymeric material(s) located behind the mask); by applying a heat conductive "mask" over areas of the surface at which curing is desired (so that sufficient heat quickly transfers through the heat conductive mask to the areas where curing of the reactive polymeric material(s) is desired); by selectively heating desired areas using laser radiation, a heat gun or other directable heat source, a heated die, etc.; by selectively activating an array of heat elements on a base member that supports the upper base member; by using a support base with heat elements or heat conductive material located only at certain desired areas for curing; etc.

Alternatively, if desired, the reactive polymeric material(s) may be applied selectively only to one or more portions of the upper base member where support (e.g., stiffening, hardening, etc.) is desired. In such methods, the reactive polymeric material(s) may be selectively applied by printing techniques (e.g., screen printing, jet printing, etc.); by masking techniques; by spraying techniques; by coating techniques; etc.

Any desired curable, reactive polymeric materials may be used without departing from this invention. In some more specific examples of this invention, reactive polymeric materials will be used that exhibit the following characteristics: the reactive polymeric material(s) will have thermoplastic properties below a certain temperature (e.g., it will become soft, pliable, and easily deformable when heated to a first temperature range), but after it is heated above a certain temperature (e.g., higher than the first temperature range) for a sufficient time period, it will "cure" and harden in an irreversible manner (e.g., thermoset by forming cross links, such as ester bond cross links). As some more specific examples, the reactive polymeric material(s) may include a water-based reactive polymer, and in some examples, the reactive polymeric material(s) may include an acrylic acid copolymer and a cross-linking agent. In some embodiments of this invention, the reactive polymeric material(s) will include a polymeric binder material free of formaldehyde, phenols, and isocyanates. As a specific example, reactive polymeric materials that may be used in at least some examples of this invention are available from BASF Corporation under the trademark ACRODUR®.

The reactive polymeric material will harden and/or stiffen the upper base member at the areas where effective thermoset curing takes place. Any desired area(s) of an upper base member may be treated and cured in this manner without departing from this invention. As some more specific examples, the reactive polymeric material may be applied and/or cured: over at least a portion of a bottom surface of the upper base member (e.g., to form a support plate for supporting all or some portion(s) of the plantar surface of a wearer's foot, such as an arch support or heel support); at an area around one or more sides and/or rear heel area of a wearer's foot (e.g., to provide a heel counter type structure); at an area along the sides or instep of a wearer's foot (e.g., to provide shape to the upper); at a toe area (e.g., to provide a more defined toe box); along the instep area to provide supports for a shoe lace (e.g., extending in a top-to-bottom direction of the upper base member at a medial or lateral side of the instep area located along the top instep sides (e.g., along a lace eyelet line), etc.); etc.

Additional features of this aspect of the invention may include engaging the upper base member (e.g., a circular knitted body, sock, or sock-type structure) with a support base (wherein at least a portion of the support base is located within an interior volume defined by the upper base member). In such methods, at least one reactive polymeric material may be applied to an exterior surface of the upper base member before and/or after the upper base member is engaged with the support base. The support base may be used to provide shape to the upper base member, while the reactive polymeric material retains shapeable, thermoplastic properties (e.g., upon adequate heating below its thermoset curing temperature and conditions). The exposing step(s) also may take place while the upper base member is engaged with the support base, if desired, although this is not a requirement.

d. Product Aspects of this Invention

Additional aspects of this invention relate to the upper base members and/or footwear components produced by the various methods described above, as well as to precursors to these components.

As more specific examples, components for articles of footwear (e.g., an upper) may include: (a) an upper base member including a textile material made from natural or synthetic fibers; and (b) a first cured, thermoset polymeric material coating individual fibers and/or provided in interstitial spaces between individual fibers of a first portion of the upper base member, wherein the first cured, thermoset polymeric material is formed at the first portion of the upper base member by curing a reactive polymeric material that coated individual fibers and/or was provided in interstitial spaces between individual fibers of the textile material at the first portion of the upper base member, and wherein the first portion of the upper base member has a greater hardness or stiffness as compared to a portion of the textile material that does not include the first cured, thermoset polymeric material. Cured, thermoset polymeric materials of this same type (having the same or different compositions, concentrations, and/or application density levels) may be provided at one or more other areas of the upper base member. When multiple areas of cured, thermoset polymeric materials are provided on a single upper base member, if desired, the different areas of the upper base member may have the same or different hardness or stiffness characteristics. Furthermore, if desired, the textile material of the upper base member may include one or more portions having uncured reactive polymeric material coating individual fibers and/or provided in interstitial spaces between individual fibers of the textile material, optionally wherein the "uncured" portion(s) of the upper base member has (have) thermoplastic properties. The reactive polymeric material(s) may be of the various types and/or have the various properties described above.

Additional potential features in accordance with some aspects of this invention include precursors to components for articles of footwear like those described above, wherein the precursors include: (a) an upper base member including a textile material made from natural or synthetic fibers; and (b) a first reactive polymeric material coating individual fibers and/or provided in interstitial spaces between individual fibers of a first portion of the upper base member, wherein the first reactive polymeric material exhibits thermoplastic properties as long as it is not exposed to thermoset curing conditions and is capable of becoming a first cured, thermoset polymeric material after it is exposed to thermoset curing conditions. Uncured reactive polymeric materials of this same type (having the same or different compositions, concentrations, and/or application density levels) may be provided at one or more other areas of the upper base member as well. The reactive polymeric material(s) may be of the various types and/or have the various properties described above. Such components including uncured reactive polymeric material(s) may be stored, optionally for an extended period of time (days, weeks, months, etc.), and then the reactive polymeric material may be cured in a desired manner (e.g., optionally selectively cured in a desired areas of portions of the upper base member so as to provide a desired final shape and/or pattern of hardened or stiffened areas). In this manner, a large bulk of "uncured" footwear components may be produced and stored, and these components can then be available for further production as desired or needed. A single "uncured" component may be produced and used for producing a wide variety of different finally "cured" component parts (e.g., depending on the upper properties desired, depending on user preferences, depending on commercial demand, etc.). Also, a single "uncured" component may be produced and used for producing different final sized footwear components.

Upper structures in accordance with still other examples of this invention may include: (a) an upper base member having a seamless plantar support surface that extends continuously to form a support for at least a portion of a plantar surface of a wearer's foot (and optionally an entire plantar surface thereof) and continuously around a lateral, midfoot side edge and a medial, midfoot side edge of the upper base member; and (b) a first support member engaged with an exterior surface of the upper base member by a bonding or adhesive material, wherein the first support member extends continuously around the lateral, midfoot side edge of the upper base member, across the plantar support surface, and around the medial midfoot side edge of the upper base member. As another option or alternative, upper structures in accordance with other examples of this invention may include: (a) an upper base member having a seamless plantar support surface that extends continuously to form a support for at least a portion of a plantar surface of a wearer's foot (and optionally the entire plantar surface) and continuously around a lateral, midfoot side edge and a medial, midfoot side edge of the upper base member; (b) a first support member engaged with an exterior surface of the upper base member by a bonding or adhesive material, wherein the first support member extends continuously around the lateral, midfoot side edge of the upper base member and along a lateral, midfoot side portion of the plantar support surface; and (c) a second support member engaged with the exterior surface of the upper base member by a bonding or adhesive material, wherein the second support member extends continuously around the medial, midfoot side edge of the upper base member and along a medial, midfoot side portion of the plantar support surface, wherein the second support member is separate from the first support member. In such structures, the portion of the second support member (e.g., an edge or a portion of an edge thereof) may be separated from the portion of the first support member (e.g., an edge or a portion of an edge thereof) by a distance of less than 1 inch at a midfoot area of the plantar support surface of the upper base member, and in some examples, by a distance of less than ½ inch or even less than ¼ inch.

In such upper structures, the upper base member may have a circular knitted construction, such as a sock or sock-like structure as described above. The support member(s) may have any of the constructions described above and/or in more detail below, such as outsole components, ground engaging components, lace support components, shape providing components, etc.

e. Additional Aspects of this Invention

Additional aspects of this invention relate to articles of footwear and methods of making articles of footwear that include the components (e.g., upper base members, uppers, etc.) as described above (and/or produced by the various methods described above). Such articles and methods may include, for example, a sole component engaged with the footwear components (e.g., upper base members) as described above. Such sole components may include one or more midsole components (e.g., foam midsole components, fluid-filled bladder midsole components, foam column type midsole components, mechanical force attenuating components, etc.), one or more outsole components (e.g., rubber, thermoplastic polyurethanes, etc.), one or more traction elements (e.g., cleats or spikes, bases for mounting cleats or spikes, etc.), etc. The sole component(s) may be engaged with the other footwear component(s) in conventional manners as are known or used in the art, such as by bonding (using adhesives or cements), by mechanical connectors, by sewing or stitching, etc.

In some examples of this aspect of this invention, the upper base member will include a single foot-insertion opening and an otherwise enclosed volume (e.g., a sock or sock-like structure, optionally one produced by a circular knitting process and having an open end and a closed end (e.g., closed by a sewn seam)). Additionally, these selectively supported footwear upper base members may be incorporated into overall footwear structures in relatively easy and simple manners. More specifically, in some examples of this invention, the footwear upper structures will be incorporated into a foot structure without the need for attachment of a strobel member at a bottom of the upper (e.g., to provide a seamless and/or continuous plantar support surface), without the need for forming a heel stitch or other stitching for the upper (e.g., because the upper may be formed as an enclosed volume with a single foot-insertion opening), etc. Thus, the upper base member may be a continuous structure that extends uninterrupted around a plantar support surface of the foot (e.g., without a seam or strobel member under the foot). Such advantageous features of some examples of this invention provide a comfortable foot support structure and can substantially reduce the time and/or labor involved in finally forming an upper and/or engaging an upper with a footwear sole structure.

Given the above general description of potential aspects and features of this invention, specific examples of structures, features, and methods according to aspects of this invention are described in more detail below in conjunction with FIGS. 1A through 8D.

II. DETAILED DESCRIPTION OF EXAMPLES OF THIS INVENTION

As described above, some aspects of this invention relate to methods of forming upper components for articles of footwear using pressing processes, such as flat-pressing procedures. FIG. 1A illustrates an example "jig" or base support member 100 that may be used in pressing processes according to at least some examples of this invention. The jig 100 of this example includes a first major surface 102a and a second major surface 102b opposite the first major surface 102a. The first and second major surfaces 102a, 102b may be flat and parallel, and they may be separated by an overall jig thickness dimension of less than 1 inch, and in some examples, less than ½ inch or even less than ¼ inch.

FIG. 1A shows the jig 100 as being made as least in part (and optionally totally) as a metal component. Such structures can be particularly useful in heat transfer steps that may be used in some methods according to this invention, such as for inductive heating of the jig 100. Also, FIG. 1A shows jig 100 as completely planar with two opposing, flat, parallel surfaces 102a, 102b. While this is a preferred arrangement in some embodiments of this invention, the surfaces 102a, 102b need not be perfectly flat and/or they need not be perfectly parallel. In other words, variations in the surface structures and/or surface orientations are possible without departing from this invention. As used in this specification, a base support surface will be considered "substantially flat:" (a) if at least 80% of the surface changes in elevation by less than ¼ inch from a mean surface level (exclusive of any openings extending completely through the base support) and/or (b) if at least 80% of the surface covered by an upper base member (described in more detail below) changes in elevation by less than ¼ inch from a mean surface level (exclusive of any openings extending through the base support. In other words, at least 80% of one of the actual surfaces described above lies within ±¼ inch of a central plane for the surface. Also, as used in this specification, base support surfaces will be considered "substantially parallel:" (a) if a direct thickness between the opposite surfaces varies by less than 15% over at least 80% of the overall surface area (exclusive of any openings extending completely through the base support) and/or (b) if a direct thickness between the opposite surfaces varies by less than 15% over at least 80% of the surface area covered by an upper base member (exclusive of any openings extending completely through the base support). The terms "substantially flat" and "substantially parallel" also encompass and include perfectly flat and perfectly parallel surfaces, respectively.

FIG. 1A further shows all (100%) of this example jig 100 has having flat and parallel surfaces. Other arrangements are possible without departing from this invention. For example, if desired, the portion of the jig 100 (if any) that will extend outside of an upper base member during production processes may include a ball, hole, slot, groove, ridge, or other structure, e.g., to enable the jig 100 to be grasped or handled more easily (e.g., by robotic arms or other machinery, by an operator, etc.).

Figure 1B:
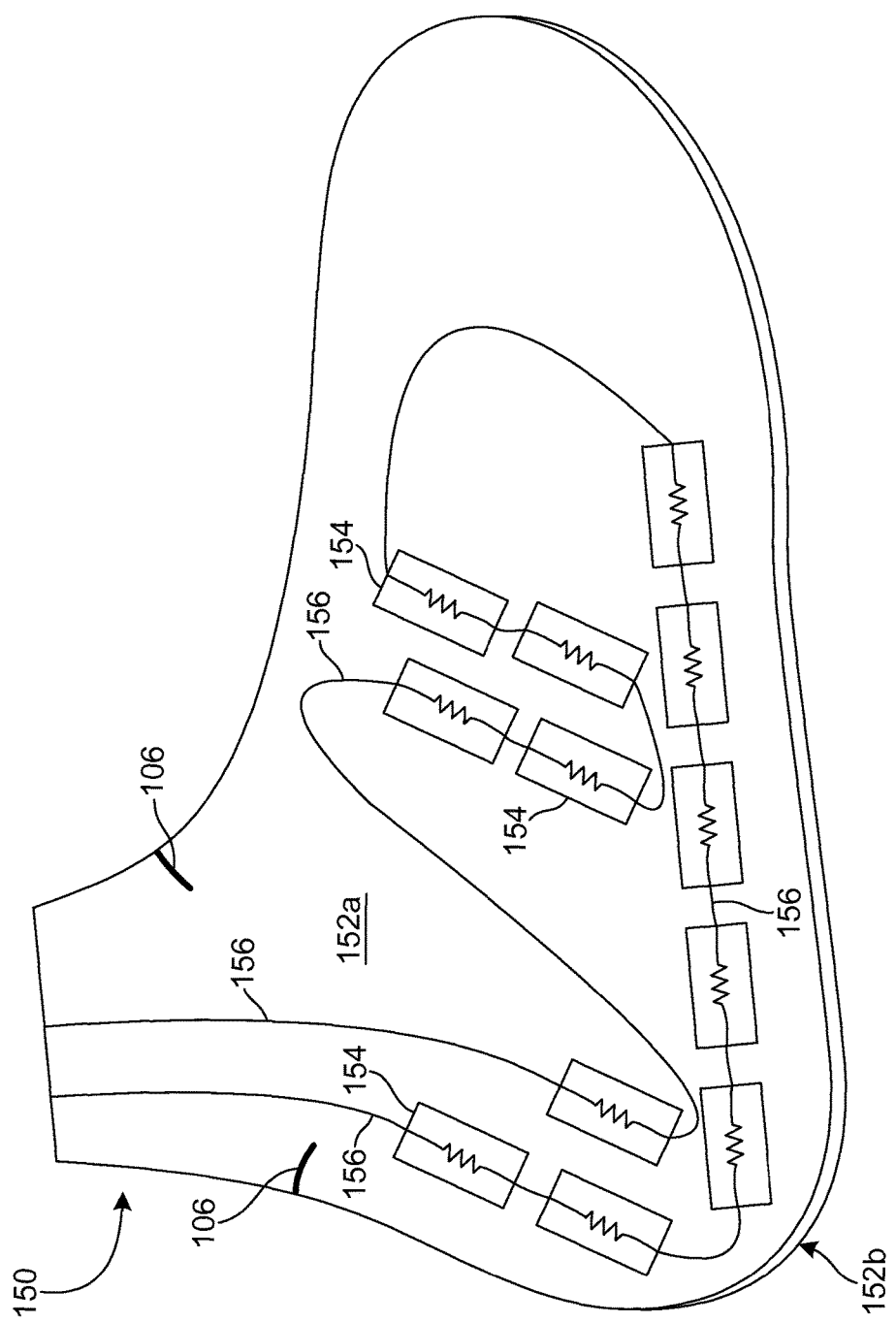

FIG. 1B shows another example jig or base support structure 150. In this example, heating elements or resistors 154 are provided on one or both surfaces 152a, 152b of the jig 150. The heating elements or resistors 154 may be formed to have a flat structure and/or may be recessed into the surface(s) 152a, 152b such that the overall jig surface(s) 152a, 152b maintain substantially flat and/or substantially parallel characteristics as described above. If desired, a single heating element and/or single resistor 154 may be provided to simultaneously heat both sides or surfaces 152a, 152b of the jig 150 at a specific location. While the heating elements or resistors 154 may be powered in any desired manner, FIG. 1B illustrates conductor leads 156 for supplying power to the heating elements or resistors 154. No specific circuit arrangement is required (or should be implied from the representative conductor leads 156 shown in FIG. 1B). As some more specific examples, flexible heating elements (such as heating elements in/on a silicone base or membrane) may be used in at least some examples of this invention. Flexible heating elements of suitable constructions are known and are commercially available.

FIG. 1C illustrates an upper base member 120 fit onto a substantially flat jig 100, 150, e.g., of the various types described above. In this illustrated example, the upper base member 120 constitutes a conventional ankle high sock structure, e.g., having a circular knit structure with one closed end 120a (optionally closed by a sewn seam) and one open end 120b, through which the jig 100, 150 is inserted into the enclosed interior chamber defined by the sock. While other circular knit and/or sock-type structures may be provided as an upper base member 120, in at least some examples of this invention, at least some of the upper base member 120 will constitute a textile component, e.g., formed from textile fibers, knitted, woven, and/or otherwise incorporated together. The jig 100, 150 may be shaped so as to substantially fill the interior chamber defined by the upper base member 120, but it may further include a portion 104 that extends out beyond the open end of the upper base member 120. This extending portion 104 may be used, for example, for engaging the jig 100, 150 with another component (e.g., manufacturing machinery) and/or for otherwise handling the jig 100, 150. Additionally or alternatively, the upper base member 120 may be specially shaped (different from a conventional sock, if desired) to better engage around and/or accommodate the jig 100, 150.

If desired, the upper base member 120 and/or the jig 100, 150 may include markings, indentations, notches, and/or other components or indicia provided for alignment purposes (e.g., to assure that the upper base member 120 is properly oriented on the jig 100, 150 for further processing). FIGS. 1A and 1B illustrate jigs 100, 150 as including one or more indicia 106 with which the top rim 126 of the upper base member 120 is to align when properly mounted on the jig 100 (see FIG. 1C). FIG. 1A further illustrates one or more notches or indentations 108 formed in the jig 100, and the operator can engage the upper base member 120 with the jig 100, 150 so that the notch(es) or indentation(s) 108 align with indicia 128 or other features provided on the upper base member 120 (e.g., by feeling the notch(es) or indentation(s) 108 through the fabric material of the upper base member 120). While specific example top rim, rear heel, and top toe alignment aids are shown in FIGS. 1A-1C, any desired numbers, arrangements, and/or types of alignment aids can be used without departing from this invention. Also, if desired, at least some of the alignment aids and/or indicia may be removable from the upper base member 120 (e.g., washed off, etc.) so that they do not appear in the final upper construction. Additionally or alternatively, if desired, features of the alignment aids and/or indicia may be incorporated to blend into and/or form a portion of an overall aesthetic design of the upper component.

Some aspects of this invention relate to using a sock or other similar upper base member 120 as a base for forming a footwear upper component. In this manner, a footwear upper can be formed having a compliant, form fitting structure that can be incorporated into an article of footwear. The use of this type of sock or sock-like structure can also eliminate the need to use and engage upper components with a strobel member and/or the need to close off the heel area of the upper by stitching or sewing. The bottom, plantar support surfaces of such upper components may be continuous with the sides and seamless. Such upper base members 120 (formed as socks or sock-like structures) also are stretchable, form fitting, and comfortable to the wearer.

It would not always be desirable, however, to simply use a sock structure (or other similar, plain textile component) alone as an upper component because such textile components generally do not have the necessary construction to adequately perform some of the desired functions of a footwear upper. For example, some footwear uppers provide various support and/or containment functions, such as shape support, heel area support (e.g., heel counter type structures), lace or other securing system supports, motion control functions, foot positioning functions, etc. Additionally, some footwear uppers provide water-resistance, waterproofing features, stain resistance, dirt resistance, abrasion resistance, durability, and the like. Also, footwear uppers may help provide desired aesthetics (e.g., colors and color combinations) to the overall shoe construction. Conventional socks, by themselves, or even if engaged with a separate footwear sole structure, may not provide all the desired functions of a footwear upper.

Figure 2A:
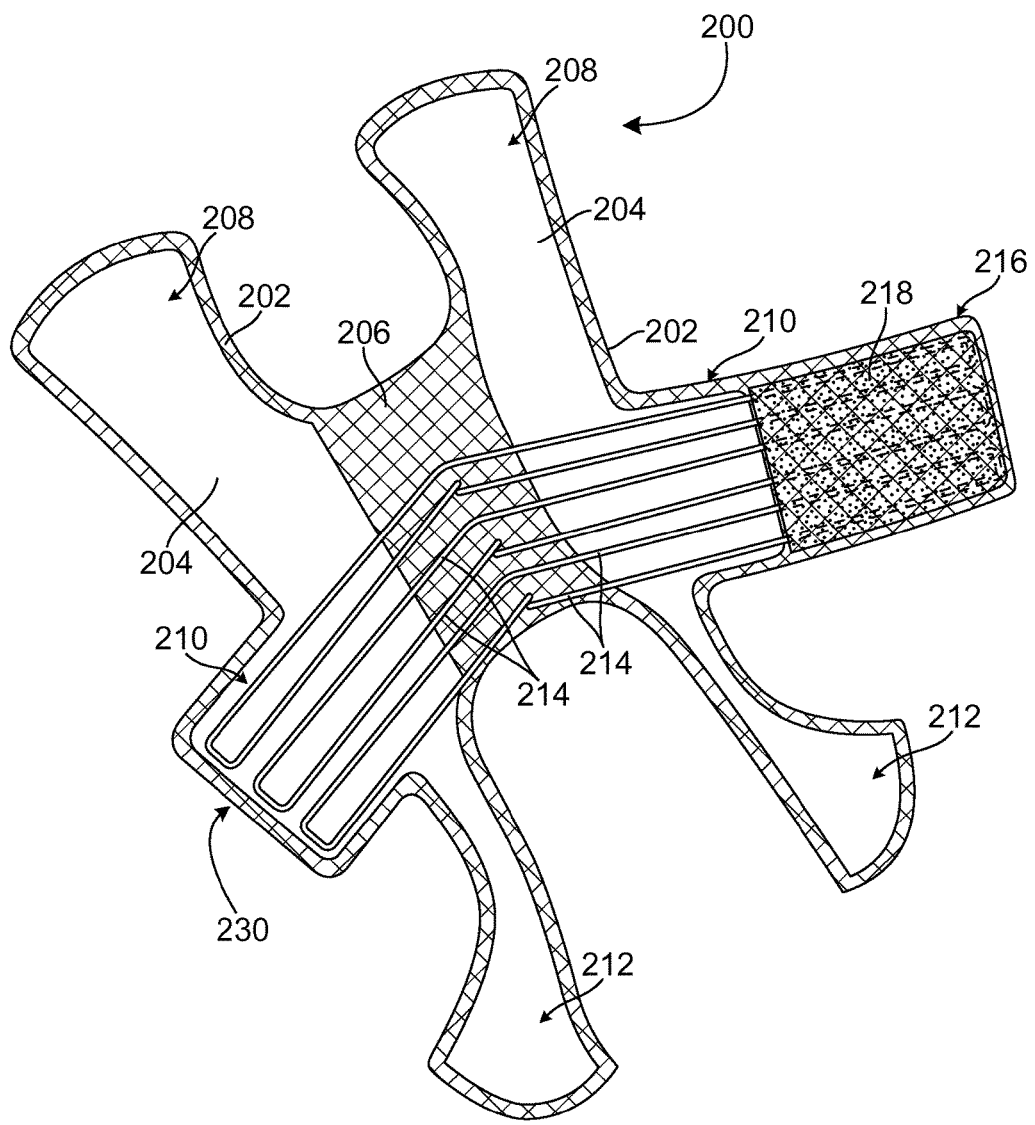
FIGS. 2A-2C show various examples of footwear support members that may be used in pressing footwear components according to some examples of this invention.
Figure 2B:
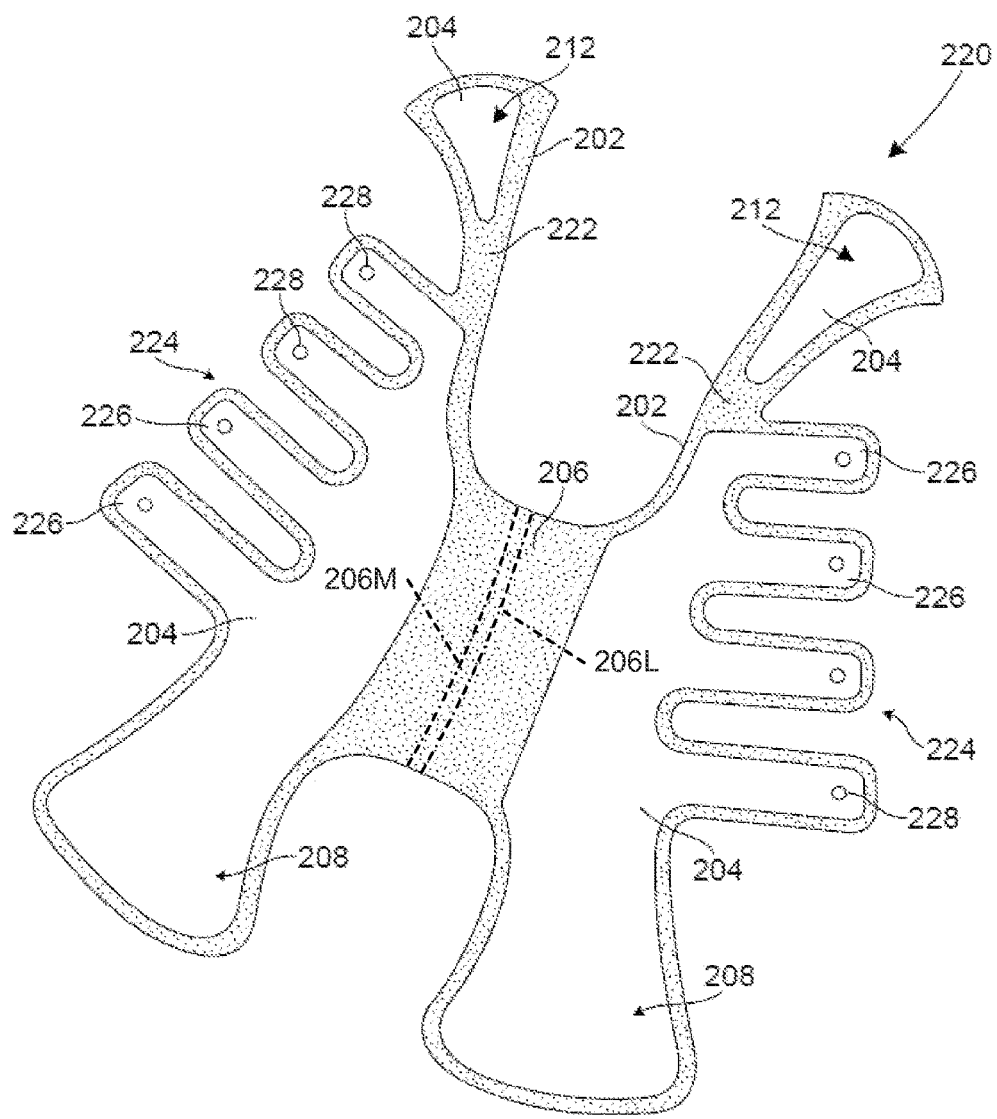
Figure 2C:
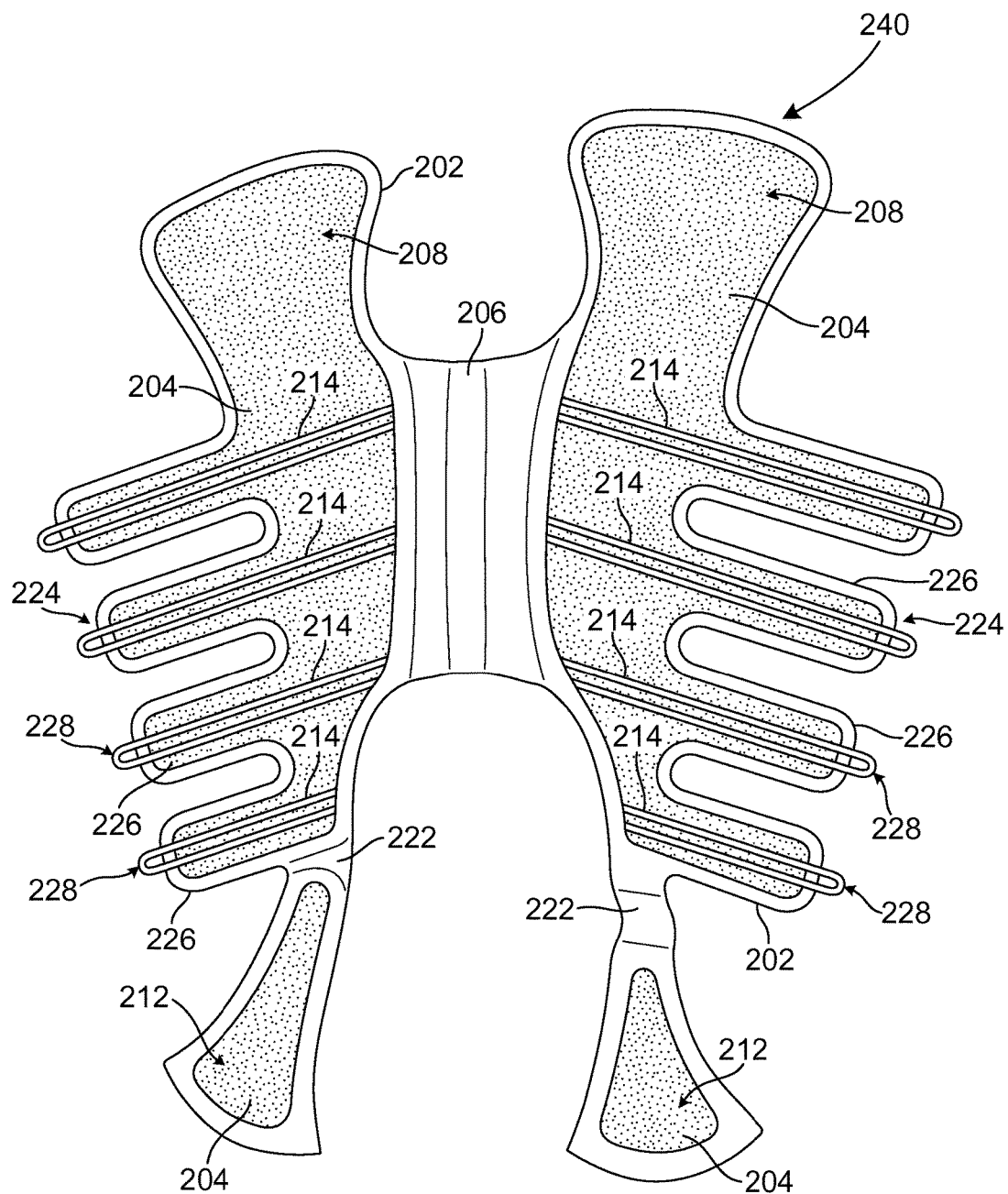

Therefore, in accordance with at least some examples of this invention, a conventional sock or other upper base member 120 (e.g., a sock-like structure, a circular knitted component, etc.) may be engaged with one or more "support members." FIGS. 2A-2C illustrate various example support members 200, 220, 240 of a "wrap around" type that are configured as contiguous (but optionally multi-part) structures that wrap around the bottom 120c of an upper base member 120 when mounted on a jig 100, 150 and extend along an exterior surface 120d of the upper base member 120 along both sides of the jig 100, 150. One or more "wrap around" support members 200, 220, 240 of this type may be provided with a single upper base member 120 without departing from this invention. Various example features of these support members 200, 220, and 240 are described in more detail below.

Support member 200 (FIG. 2A) includes an exterior base component 202 to which additional support materials 204 are engaged on opposite sides of a central area 206 of the exterior base component 202. In use, this example support member 200 will be oriented with respect to an upper base member (e.g., 120) in a manner such that the support materials 204 will directly face and contact opposite sides of the exterior surface (e.g., 120d) of the upper base member 120 on jig 100, 150. Thus, an underside or interior of the support member 200 is illustrated in FIG. 2A. The support member 200 includes side heel support areas 208 (for both the lateral and medial sides of the upper), instep/midfoot support areas 210 (for both the lateral and medial sides), and forefoot side edge support areas 212 (for both the lateral and medial sides). In this illustrated example, the exterior base component 202 is a non-woven textile and the additional supports 204 include EVA foams. Other example exterior base components 202 include, but are not limited to: polyurethanes, TPUs, suedes, leathers (natural or synthetic), spacer meshes, other textiles, and the like. Other example support materials 204, when present, include but are not limited to: polyurethanes or other foams, textiles, inelastic components, etc. Materials including the upper materials described in U.S. Pat. No. 8,429,835 may be used for base component 202 and/or additional support materials 204. The additional support materials 204, when present, may be engaged with the exterior base component 202 in any desired manner, such as by adhesives or cements, by stitching or sewing, etc.

The interior surface of the exterior base component 202 at these support areas 208, 210, and 212 in this example are predominantly covered by the additional support materials 204, although a greater or lesser coverage by the additional support material(s) 204 may be used without departing from this invention (in fact, if desired, support material(s) 204 could be eliminated from this structure). The central area 206 of the exterior base component 202 supports the arch area of a wearer's foot, and in this example, remains uncovered by additional supports material 204. While this illustrated central area 206 primarily supports the midfoot/arch area, support may be provided at the bottom heel, bottom forefoot, and/or any desired portion(s) or combination of portions of the plantar surface of the foot.

Any desired area, portion, or proportion of the base component 202 and/or the additional support material(s) 204 may include a bonding or adhesive agent (e.g., a layer) applied to it. As some more specific examples, if desired, at least some of the perimeter area of the base component 202 may include a bonding or adhesive material applied to it, such as a hot melt adhesive, a pressure sensitive adhesive, reactive polyurethane adhesives (PUR), etc. In some examples of this invention, the entire base component 202 and additional support material(s) 204, if any, will not be covered with the bonding or adhesive materials so as to allow some relative movement or flexibility between layers of the overall upper structure. The bonding or adhesive agent may be applied to the base component 202 and/or additional support material(s) 204 in any desired manner, such as by coating, spraying, printing, etc.

The side instep/midfoot support areas 210 in this example structure 200 include elongated wire-like strands 214 of substantially inelastic material that extend along the sides and around the interior bottom central area 206 of the support member 200 at the midfoot area. These strands 214 help provide a close and adjustable fit around at wearer's foot (e.g., when a lace or other securing system is tightened). The term "substantially inelastic" as used herein in this context, means a material that does not increase in length more than 10% in a direction of an applied tensile force, under forces typically used in tightening a shoe lace around a human foot.

A securing system for a footwear upper is provided as part of the support member 200 in this example construction. More specifically, the medial instep/midfoot support area 210 of this example structure includes a securing strap 216 at its free end. The free end of the securing strap 216 has one portion of a mechanical fastener 218 engaged with it (a portion of a hook-and-loop fastener, in this specific example, although a portion of a snap, buckle, or other securing component could be used). As will be described in more detail below, in use, this securing strap 216 portion will extend over the instep area of the upper at the midfoot to engage another portion of a mechanical fastener 230 provided on the exterior surface of the exterior base component 202 at the lateral instep/midfoot support area (another portion of a hook-and-loop fastener, not visible in the view of FIG. 2A, but see FIG. 5B). When the securing strap 216 is pulled tight around a wearer's foot to engage fastener portions 218, 230 with one another, the strands 214 will at least partially wrap around the foot, holding and fitting the support member 200 to the wearer's foot.

FIG. 2B illustrates another example support member 220 that may be engaged with an upper base member, like member 120 shown in FIG. 1C. This example support member 220 is similar to that shown in FIG. 2A and includes an exterior base component 202 to which additional support materials 204 are engaged on opposite sides of a central area 206 of the exterior base component 202. In use, this example support member 220 will be oriented with respect to an upper base member (e.g., 120) in a manner such that the additional support materials 204 will directly face and contact opposite sides of the exterior surface (e.g., 120d) of the upper base member 120. Thus, an underside or interior of the support member 220 is illustrated in FIG. 2B. A bonding or adhesive material, e.g., of the types described above, may be provided on some or all of the interior surface(s) of exterior base component 202 and/or additional support material(s) 204.

Like the support member 200 of FIG. 2A, this example support member 220 includes side heel support areas 208 (for both the lateral and medial sides) and forefoot side edge support areas 212 (for both the lateral and medial sides). Rather than a single continuous additional support material 204 on each side of this support 220 (as shown in the example of FIG. 2A), in this illustrated example, each side of the interior of support member 220 includes two separate areas of additional support material 204 (e.g., made of EVA or other material as described above). More specifically, as shown in FIG. 2B, each side of support member 220 includes: (a) one additional support material area 204 covering a majority of the heel and midfoot/instep support areas 208 and (b) one additional support material area 204 at the front, forefoot support area 210 with a gap 222 of exposed base component 202 on each side of the support member 220 between these respective additional support areas 204. More or fewer separate support areas 204 may be provided on each side of the support member 220, if desired, without departing from this invention, and the two sides may have different numbers of support areas 204, if desired. Again, as in the embodiment of FIG. 2A, the central area 206 of the exterior base component 202 supports the arch area of a wearer's foot, and in this example, remains uncovered by additional support material 204. More, less, and/or different areas of the plantar surface may be supported by the base component 202 and/or additional support component(s) 204, if desired.

The instep/midfoot support areas 224 in this example structure 220 differ from those provided in the structure 200 of FIG. 2A. More specifically, in this example, the instep/midfoot support areas 224 include a plurality of elongated separated strips 226 that will extend along the medial and lateral sides of the footwear upper component in the final upper construction. While four strips 226 are shown on each side of support member 220 in this example, more or fewer support strips 226 may be provided (and a different number of support strips 226 may be provided on opposite sides) without departing from this invention. If desired, the free ends of these strips 226 may include holes, eyelets, loops, and/or other structures 228 for engaging a lace or other securing system for the final upper component. Some portion of these free ends may be free of bonding or adhesive material, e.g., so that the very free end(s) remains unattached to the upper base member 120 and freely available to engaged a lace.

While it is not a requirement, if desired, the exterior base component 202 of this support member 220 may be made of a material such that the strip(s) 226 provided along the instep/midfoot sides are substantially inelastic. Substantially inelastic strips 226 of this type (also called "bands" or "straps" herein) can provide at least some of the fit and securing functions of the substantially inelastic strands 214 described above in conjunction with FIG. 2A.

FIG. 2C illustrates another example support member 240. This support member 240 is similar to those illustrated in FIGS. 2A and 2B, and the same reference numbers are used to refer to the same or similar parts (and the detailed description thereof is omitted). In this illustrated example structure 240, however, each individual strip 226 has one or more substantially inelastic strands 214 engaged with it. In this illustrated example, each strip 226 includes a single strand 214 engaged with it, and the strands 214 extend beyond the free end of each strip 226 to form an exposed loop 228. The exposed loop 228 may be used to engage a shoe lace or other securing system for the upper. The opposite ends of the strands 214 extend down the strip 226 and toward the central area 206 and engage to at least one of and/or between the exterior base component 202 and/or the additional support material 204.

FIGS. 2A-2C illustrate additional support materials 204 (e.g., EVA or other materials). These materials 204 may overlay other components or structures of supports 200, 220, 240, including exterior support 202, and these components 202, 204, etc. provide one or more desired characteristics to locations of the overall upper, such as shape support, stiffness, durability, abrasion resistance, water resistance, impact force attenuation, lace or engaging system support, etc. Again, any desired portion or proportion of support 200 (e.g., supports 202 and/or 204 (if any)) may have bonding or adhesive material applied to it, e.g., by coating, spraying, etc., so as to enable the support 200 to be engaged with an upper base member 120 as will be described in more detail below.

Figure 3:
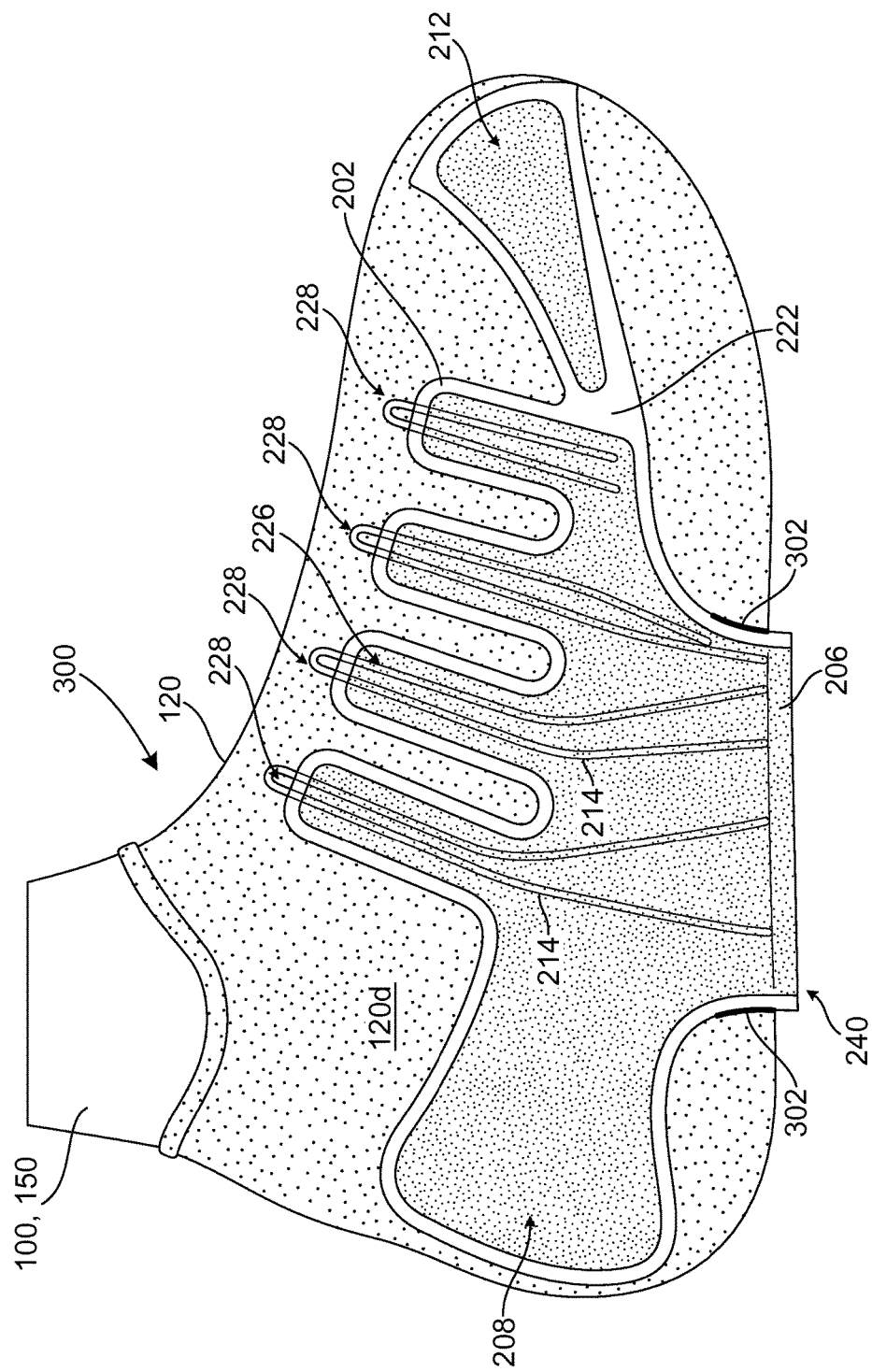
FIG. 3 illustrates an example component that may be processed by pressing (e.g., flat pressing) in accordance with some examples of this invention.

FIG. 3 illustrates an example of an upper base member 120 engaged with a jig 100, 150 (e.g., as shown in FIG. 1C), with a support member (e.g., like support members 200, 220, or 240) wrapped around and engaged with the exterior surface 120d of the upper base member 120. The support member shown in FIG. 3 generally corresponds to the example support component 240 of FIG. 2C (and like references numbers are used in each figure to refer to the same or similar parts). If necessary or desired, a light adhesive, mechanical connectors, and/or other temporary securing means may be used to temporarily engage the support member 240 with the upper base member 120 to hold it in place until a desired time for further processing (as will be described in more detail below). The overall combination or assembly of the jig 100, 150, upper base member 120, and support member 240 is represented in FIG. 3 by reference number 300. Multiple support members may be provided on a single upper base member 120, if desired, including separate support members on each side of jig/upper base member, if desired.

While the figures show support members 200, 220, 240 as relatively flat members, these members may have some non-flat shape/features without departing from this invention. For example, if desired, component 202 may be a molded structure (such as molded TPU) that does not have a completely flat shape. As an additional example, component 202 may have texturing or surface features. Additionally or alternatively, if desired, the additional support member(s) 204 (e.g., an EVA or polyurethane foam material) may have some significant thickness such that the overall combination of base support 202 and additional support(s) 204 have a varying thickness over the area of support 200. Accordingly, it is not necessary that the support members 200, 220, and/or 240 be completely or substantially flat.

Also, in some examples of this invention, the upper base member 120 and/or the support member 200, 220, 240 may include markings, indentations, notches, and/or other components or indicia provided for alignment purposes (e.g., to assure that the support member 200, 220, 240 is properly oriented on the upper base member 120). For example, FIGS. 1C and 3 illustrate upper base member 120 as including one or more indicia 302 with which the front and rear of the central area 206 of the support member 240 may be aligned. Other types, numbers, positions, and/or arrangements of alignments aids may be provided without departing from this invention. If desired, at least some of the alignment aids and/or indicia may be removable (e.g., washed off, etc.)

so that they do not appear in the final upper construction. Additionally or alternatively, if desired, features of the alignment aids and/or indicia may be incorporated to blend into and/or form a portion of an overall aesthetic design of the upper component.

FIG. 4 illustrates an example "assembly line" diagram that schematically illustrates some examples and features of methods according to this invention. "Station 1" in this example is a loading station where an assembly 300 (e.g., including a jig 100, 150, an upper base member 120, and a support member 240) is mounted to a conveyance system that moves the assembly 300 through the process. While other arrangements are possible, in this illustrated example, the assembly 300 is mounted "upside down" so that the bottom 206 of the base support member 240 is located at a top of the mounted assembly 300 and maintained in contact with the upper base member 120 under the force of gravity (and optionally by some additional securing means). The connection of the assembly 300 to the conveyance system further may include electrical connections and/or hardware/ connectors for other components necessary or desired for the production process (e.g., connections or hardware for heating elements 154, for heating/coolant flow, for inductive heating, etc.).

In this illustrated example, the assembly 300 is substantially flat and thin. The mounted assembly 300 moves toward Station 2 along with two pressure plates 402, one provided on each side of the assembly 300. Optionally, the assembly 300 may be engaged with one or both pressure plates 402. The pressure plates 402 may be connected to one another (e.g., by a hinge or other structure) or they may be separate from one another. The pressure plates 402 may support some or all of the electrical connections and/or hardware described above. Once all components are properly mounted and oriented with respect to one another, the pressure plates 402 close around at least a portion of the assembly 300, as shown at Station 2 in FIG. 4 (e.g., so that pressure plate surfaces 402a contact the exterior of the assembly 300). In at least some examples of this invention, the portion of the assembly 300 located between the pressure plates 402 when closed and under compressive force may be less than 1 inch thick, and in some examples, less than ¾ inch thick, less than ½ inch thick, or even less than ¼ inch thick.

At this point, the interior surface of support member 240 (with at least some portion of its interior surface provided with a bonding or adhesive component, such as a hot melt layer) may be pressed against the outside 120d of the upper base member 120 under some level of compressive force. From Station 2, the assembly 300 between pressure plates 402 may be moved into and through a heat and/or compressive force application zone 410, as shown in FIG. 4. The zone 410 may include additional pressure applying devices (e.g., compressive rollers 412), heating devices, cooling devices, and/or other hardware as necessary or desired to provide a desired level of heating and/or pressure to the assembly 300 located between the pressure plates 402. If desired, the zone 410 may include programmable components to allow application of controlled and programmable heating, pressing, and/or cooling protocols to the assembly 300. Also, if desired, the zone 410 may include coils and/or other appropriate components to induce inductive heating of jig 100. The applied heat and/or pressure in zone 410, optionally heating the hot melt material on support 202/204 from inside and through the material of the upper base member 120, causes the hot melt material of the support member 200, 220, 240 to melt (and optionally draw into the structure of the upper base member 120 toward the heat source), which adheres the support member 240 to the upper base member 120.

After the assembly 300 leaves the zone 410, if necessary, it may move along the conveyance system to a removal location, shown as Station 3 in the example of FIG. 4. The conveyance system may move the assembly through a cooling zone, if desired (e.g., if zone 410 does not itself include a cooling area and/or cooling protocol). Alternatively or additionally, the pressure plates 402 may remain clamped around the assembly 300 (and still applying a compressive force to the assembly 300) for a sufficient time after they leave the zone 410 for cooling to occur and/or to assure an adequate bond has developed between the support member 200, 220, 240 and the upper base member 120. Other processing may occur between zone 410 and Station 3, if desired. At Station 3, the pressure plates 402 can be opened (e.g., rotated open about hinge connection) and the assembly 300 can be removed from the pressure plates 402.

In the example described above, the entire assembly 300 is attached to and removed from the pressure plates 402 and/or an area between pressure plates 402. Other arrangements are possible without departing from the invention. For example, if desired, jigs 100, 150 may remain engaged with (optionally removably engaged with) the pressure plate(s) 402. In such a system, at Station 1 the upper base member 120 and support member(s) 200, 220, 240 may be engaged and properly positioned with respect to one another and with respect to the jig 100, 150, and at Station 3 the combined upper base member 120 and support member(s) 200, 220, 240 may be removed from its respective jig 100, 150 as a combined, unitary, single component 420. This combined, unitary, single component 420, which may be comprised of a sock or sock-type component 120 having one or more support components 200, 220, 240 adhered to it by a bonding or adhesive material, then may be used for constructing an article of footwear as will be described in more detail below in conjunction with FIGS. 5A-5D.

Optionally, if desired, the combined, unitary, single footwear components 420 produced by the process described in conjunction with FIG. 4 may be stored until needed for further production. Their relatively flat production and structure at this time in the process makes storage and handling very space efficient. Also, because the overall components 420 may have some flexibility and stretchability (e.g., because of the sock-type construction of the upper base member 120), a single sized upper component 420 (with a single sized support member 200, 220, 240 engaged with it) may be used for a range of final footwear sizes (e.g., for a range of 2-6 conventional shoe sizes in length and/or for a range of 2-6 conventional shoe sizes in width, and in some examples, for a range of 2-4 conventional shoe sizes in length and/or for a range of 2-4 conventional shoe sizes in width). This feature can save significant tooling and/or inventory costs (e.g., as compared to tooling/inventory costs associated with building molds and/or maintaining inventories for upper components at every specific size interval).

Also, while generally "flat pressing" processes are described with respect to FIGS. 1A-4, if desired, the item pressed may have a three-dimensional structure. This may be accomplished in various ways. For example, if desired, the jig and pressure plates could be designed to have complementary shaped surfaces so as to allow pressure to be applied around the structure in various different directions. As another example, a three-dimensional jig and upper base member 120 (with one or more support members engaged therewith) could be mounted in a vacuum chamber in which an outer surface pulls inward under vacuum pressure to apply compressive force to the upper base member and jig surfaces inside the chamber.

Figure 5A:
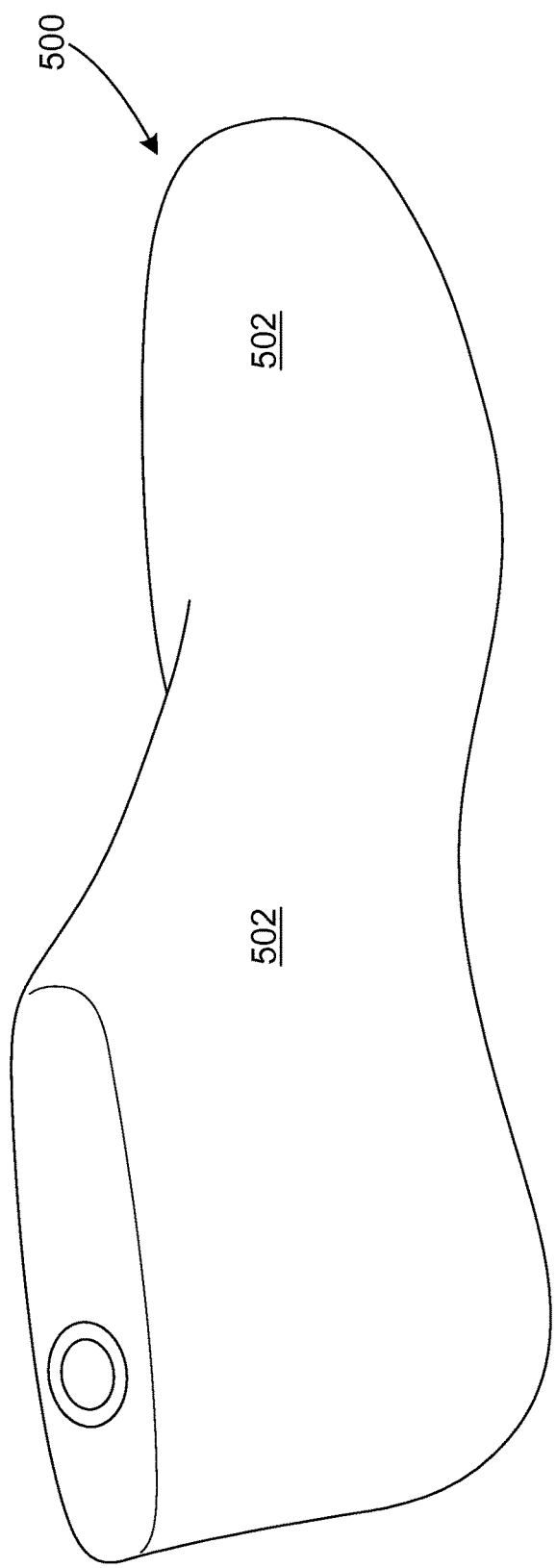
FIGS. 5A-5D illustrate additional features of footwear production using selectively supported footwear components in accordance with some examples of this invention.

FIG. 5A illustrates a support base 500 used in making footwear structures in accordance with at least some examples of this invention. At least some portion(s) of the exterior surface 502 of support base 500 of this example may be sized and shaped to produce a desired final shape of a footwear upper product, as will be described in more detail below. As some more specific examples, one or more of the side heel areas, the rear heel area, the instep side areas, the lace support areas, the plantar surface support areas (i.e., the bottom surface), and/or the toe box area of the support base 500 may be sized and shaped as desired for the final footwear product. The support base 500 may resemble a conventional footwear last.

Figure 5B:
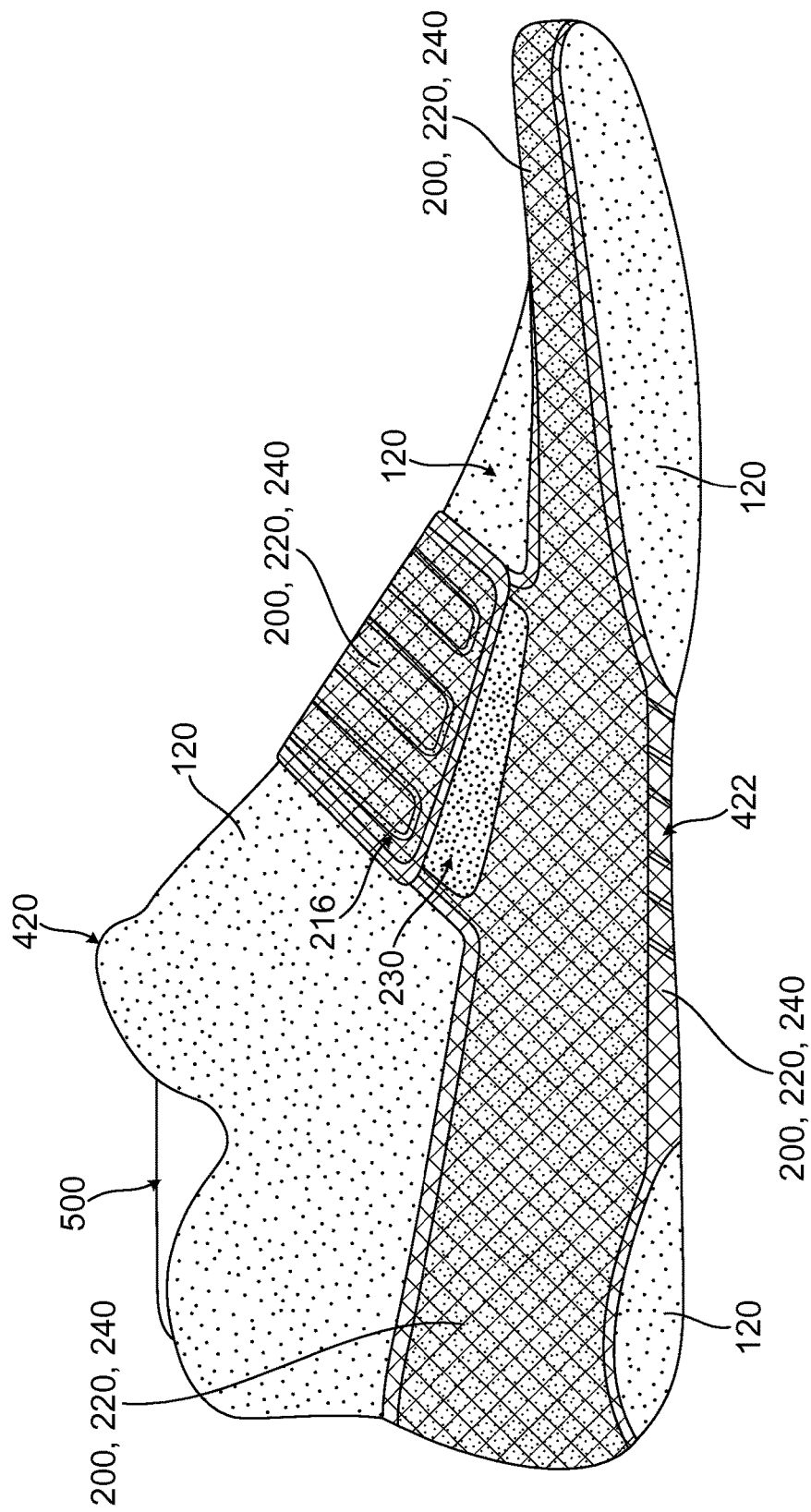
Figure 5C:
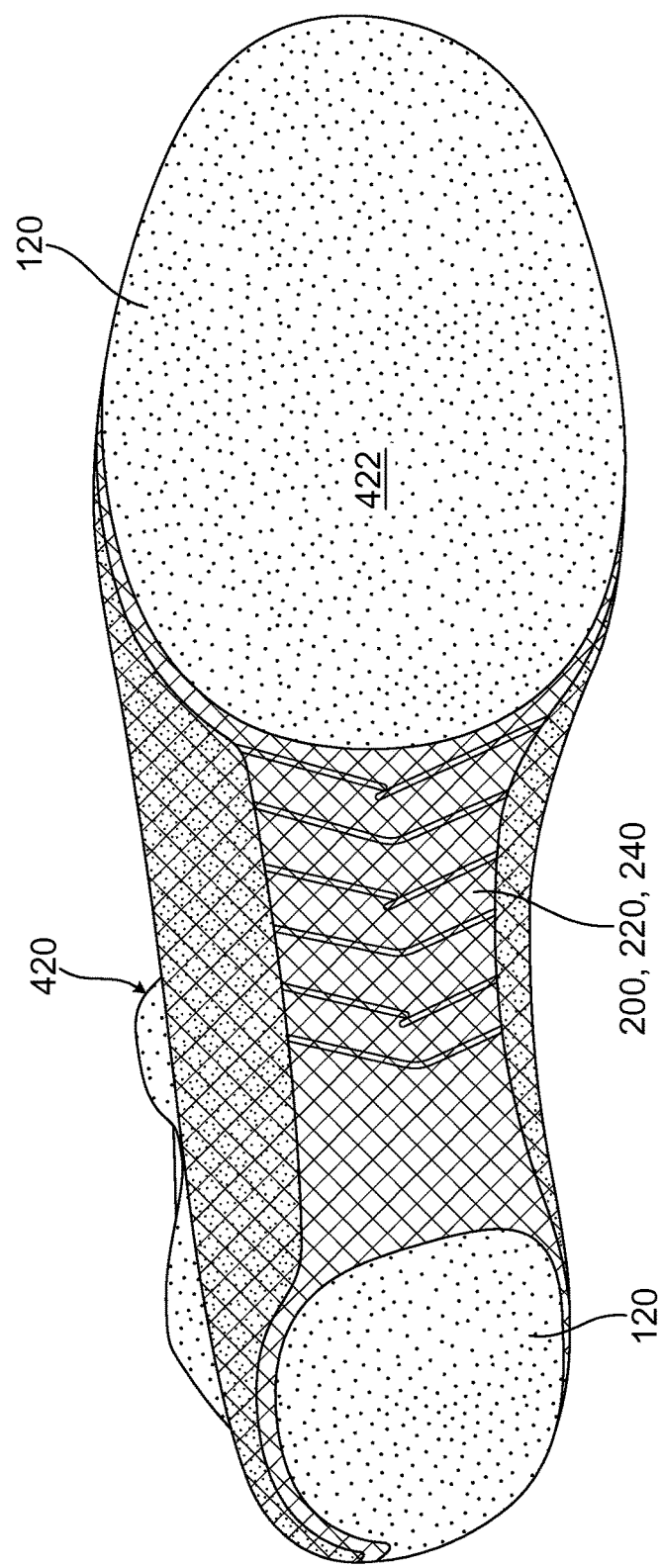

Next, as shown in FIG. 5B, the upper component 420 (e.g., as produced in the processes described in conjunction with FIG. 4) is applied over the exterior surface 502 of the support base 500. FIG. 5C shows a bottom view of the combined upper component 420 mounted on the support base 500 (showing the outside of the plantar support surface 422 of the upper component 420). When placed on the support base 500, some or all of the support member 200, 220, 240 may be shaped and/or otherwise treated so as to be formed into and/or maintained in a desired shape (e.g., using thermoplastic or thermosetting properties, using shape memory materials, etc., the shape of at least some portion of the upper component 420 (e.g., support member 200, 220, 240) may be modified). Additionally or alternatively, if desired, at least some portions of the support member 200, 220, 240 and/or the upper base member 120 may be maintained in the desired shape at this stage solely by the presence of the underlying support base 500.

FIGS. 5B and 5C illustrate an example footwear component 420 in which a support member 200 like that illustrated in FIG. 2A is engaged with the upper base member 120. As shown in FIG. 5B, the upper base member 200 includes a securing flap 216 having a portion of a fastener system on its underside (218, see FIG. 2A) that engages a portion of the fastener system 230 included at the exterior surface of the support member 200. The flap 216 extends over the wearer's instep area from one side of component 420 to the other and secures the upper to the wearer's foot in use.

Notably, as shown in FIGS. 5A-5C, because the upper base member 120 starts out as a circular knitted component, e.g., a sock or sock-like structure, the bottom plantar support surface (FIG. 5C) is a continuous structure such that no strobel element and/or bottom seam is needed to close off the foot-receiving chamber. Additionally, the rear heel area of this example upper base member 120 constitutes a continuous structure without the need for a rear heel seam and/or sewing step. These features provide a comfortable plantar support surface and/or eliminate significant manufacturing steps (thereby saving time, labor, and/or money) as compared to many conventional footwear structures and footwear production techniques.

Figure 5D:
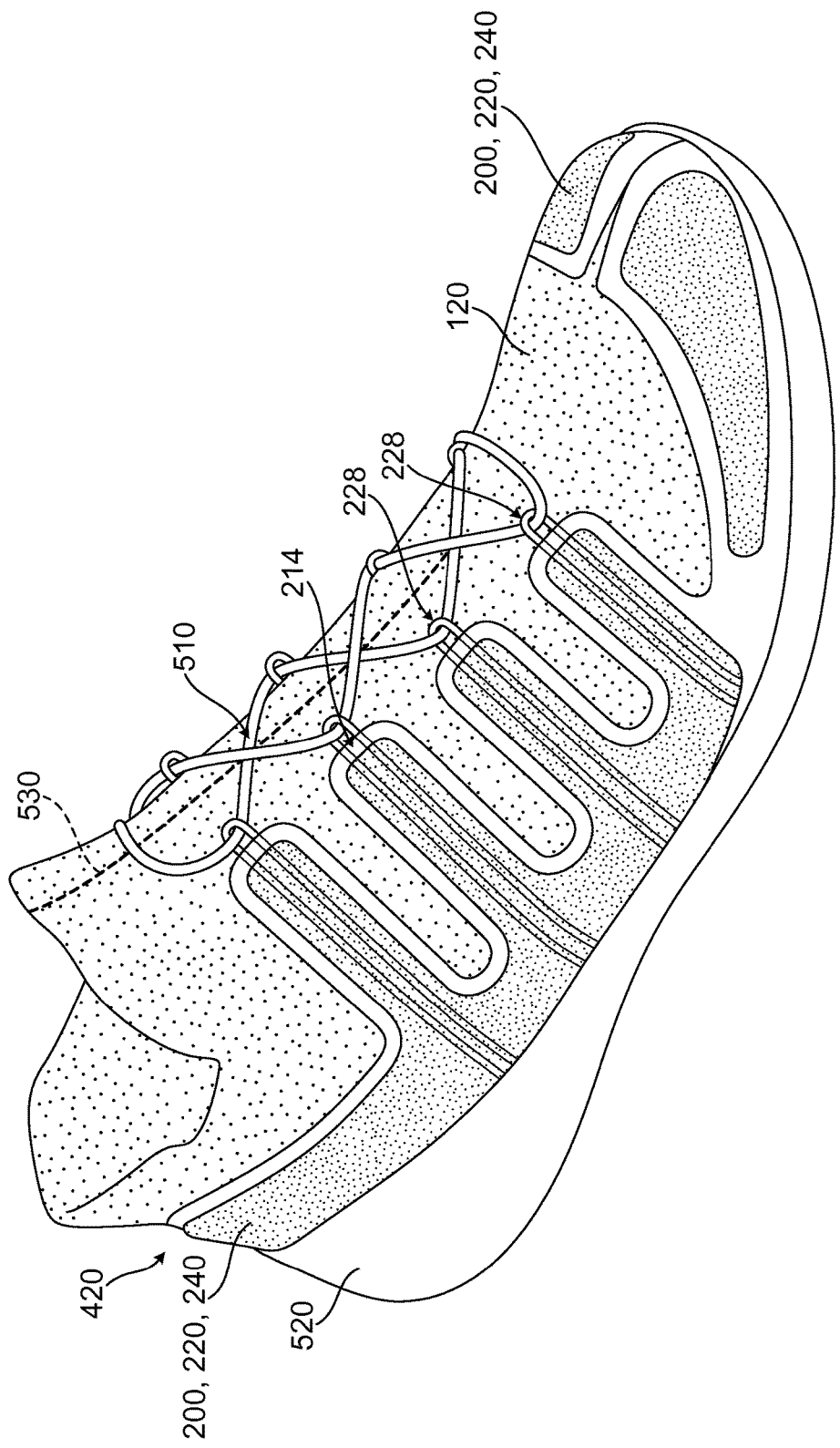

Then, optionally while the support base 500 remains inside the upper component 420, the upper component 420 may be engaged with at least a portion of a sole structure for an article of footwear. For example, as shown in FIG. 5D, the upper component 420 (including an upper base member 120 and one or more support members 200, 220, 240) may be engaged with a midsole impact force attenuating component, such as one or more midsole foam elements 520 as shown in FIG. 5D. Any desired manner of connecting these components 420 and 520 may be used without departing from this invention, including manners conventionally known or used in the footwear art, such as one or more of: adhesive or cements (e.g., applied to portions of the exterior bottom and/or side surfaces of the upper component 420, applied to the top surface of the midsole component 520, etc.); mechanical connectors, such as hook-and-loop type fasteners (optionally releasable mechanical connectors); sewing or stitching; etc. Also, any desired type of midsole component construction may be applied to the upper component 420 without departing from this invention, including, for example, midsole components including one or more fluid-filled bladders, midsole components including one or more foam impact force absorbing columns, midsole components including mechanical impact force absorbing columns or elements, etc. If desired, the bottom surface of midsole component 520 may be structured to provide natural motion, traction, and/or durability and/or to otherwise engage a contact surface in use.

Additional sole components or structures may be applied to the midsole component 520 and/or the upper component 420 without departing from the invention, such as one or more outsole elements (e.g., rubber or TPU ground contacting pads), cleat base components, cleats (permanently or removably mounted), cup-sole components, etc. Also, any desired manner of connecting the outsole element(s) to the remainder of the structure may be used without departing from this invention, including manners conventionally known or used in the footwear art, such as one or more of: adhesive or cements, mechanical connectors, sewing or stitching, etc.

In contrast to the footwear securing system (strap 216 and hook-and-loop fastener 218, 230) shown in FIGS. 5B and 5C, the footwear component 420 of FIG. 5D includes a different type of securing system. More specifically, the support member shown in FIG. 5D generally corresponds in structure to the support member 240 shown in FIG. 2C. As shown in FIG. 5D, this support member 240 includes substantially inelastic strands 214 along the instep side areas of the upper. Exposed portions of these strands 214 at the top instep area form loops 228 through which a conventional shoe lace 510 may be engaged (e.g., to lace up the upper in a generally conventional manner). When the lace 510 is tightened around a wearer's foot, the substantially inelastic strands 214 can be pulled to snugly engage the support member 240 and the overall component 420 around the sides of the wearer's foot.

Because of the sock type upper base member 120 in this example, a conventional tongue is not needed in this example article of footwear beneath the lace 510, as shown in FIG. 5D. Rather the sock or sock-like structure of the upper base member 120 extends continuously over the instep area where a tongue would conventionally be provided (and may generally perform the functions of a conventional tongue). Additionally or alternatively, if desired, a conventional tongue member could be provided (e.g., sewn to upper base member 120) and/or the upper base member 120 could be cut or slit (530) from the ankle opening downward, along the instep, and toward the toe area between the lace engaging loops 228 (e.g., if the upper base member 120 is not sufficiently stretchable to allow easy insertion and removal of a foot). A tongue member and/or instep slit 530 may be provided, if desired, before the upper 420 is engaged with sole component 502.

Figure 6A:
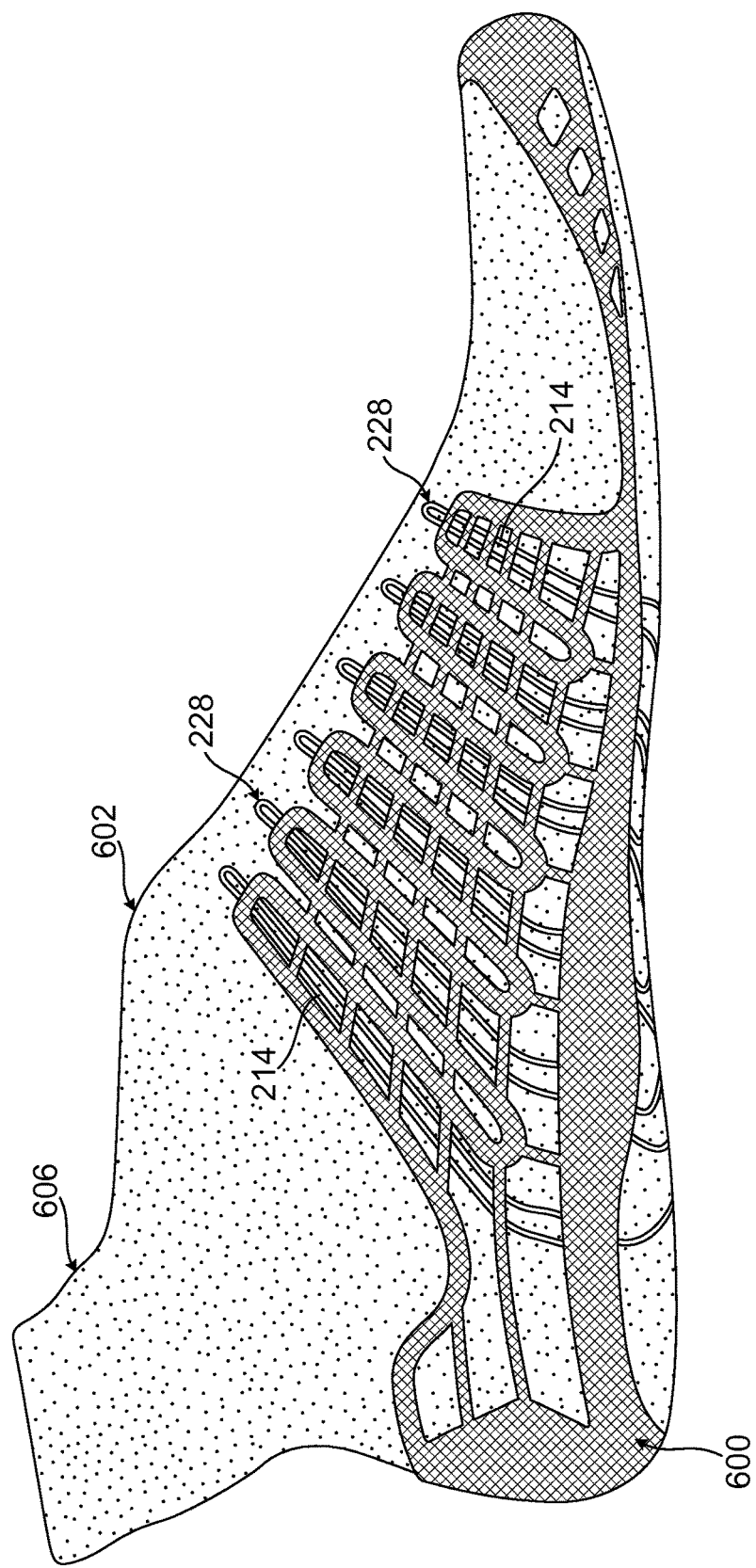
FIGS. 6A and 6B illustrate another example selectively supported footwear component according to this invention.
Figure 6B:
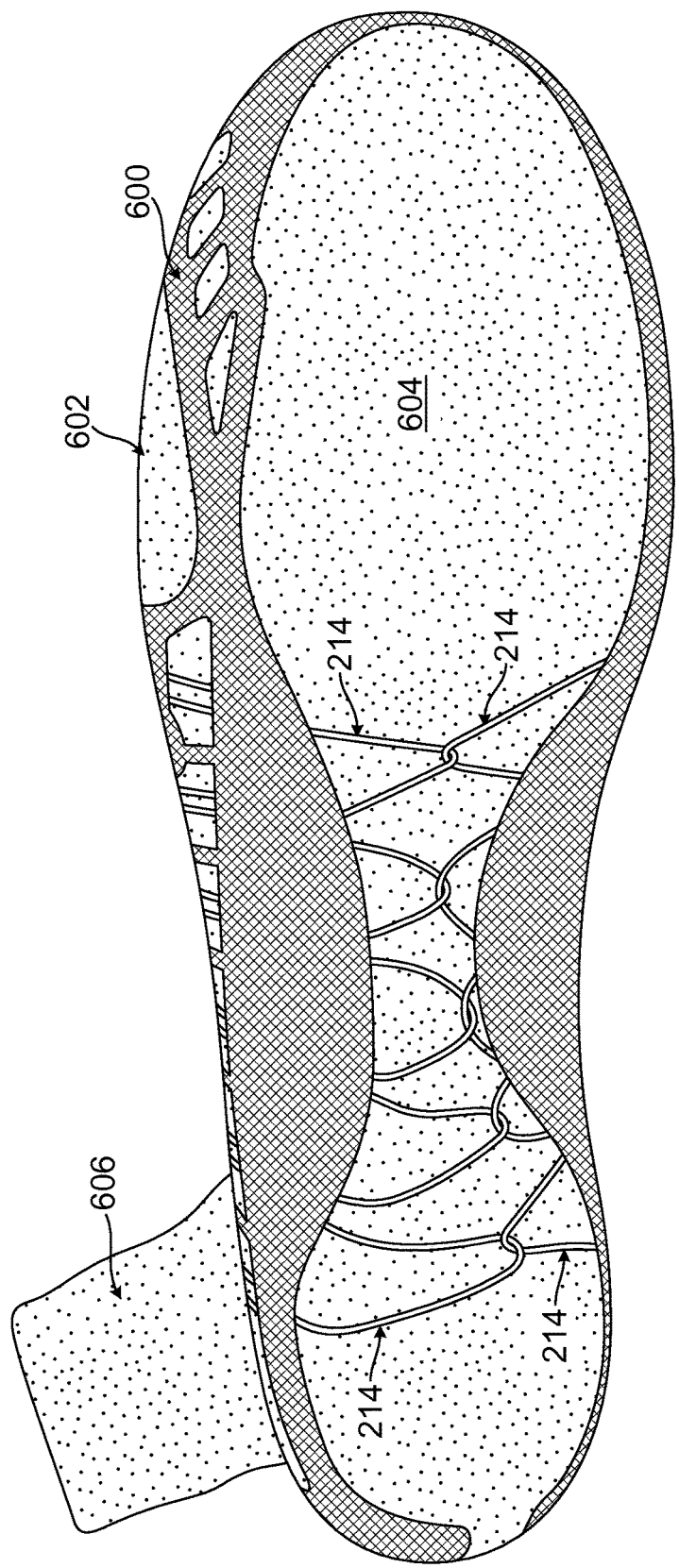

FIGS. 6A and 6B illustrate side and bottom views, respectively, of another example support member 600 engaged with an upper base component 602 (e.g., after an engaging process, like that described in conjunction with FIG. 4) and applied over a support base (e.g., like that shown in FIG. 5A). While this example support member 600 includes a non-woven textile base structure, substantially inelastic strands 214, and lace engaging loops 228 like those shown in FIGS. 2C and 5D, the strands 214 in this example are more exposed along their lengths down the sides of the support member 600. This support member 600 is more of a minimalist construction, e.g., with less support member 600 area, more and/or larger openings in the support member 600, no additional support material 204, etc. Also, separate strands 214 are provided on each side of the support member 600, but as shown in FIG. 6B, in this example structure, the strands 214 from opposite sides of the support member 600 meet at the bottom 604 of the upper base member 602 and loop through one another (similar looped or intertwined strands 214 could be provided in the structure of FIG. 2C, if desired). This support member 600 and upper base component 602 combination may be engaged with a sole structure, e.g., in the manners described herein (including in the manner described above with respect to FIGS. 5A-5D). FIGS. 6A and 6B further illustrate that the upper base component 602 may have an extended upper area 606 that extends up to or even beyond a wearer's ankle (and optionally beyond the top of support base 500). If desired, this upper area 606 may be constructed and fit like a conventional sock (e.g., as a circular knitted construction). The example of FIGS. 6A and 6B lacks the additional support materials 204 shown in some of the other example support members 200, 220, 240.

Figure 7B:
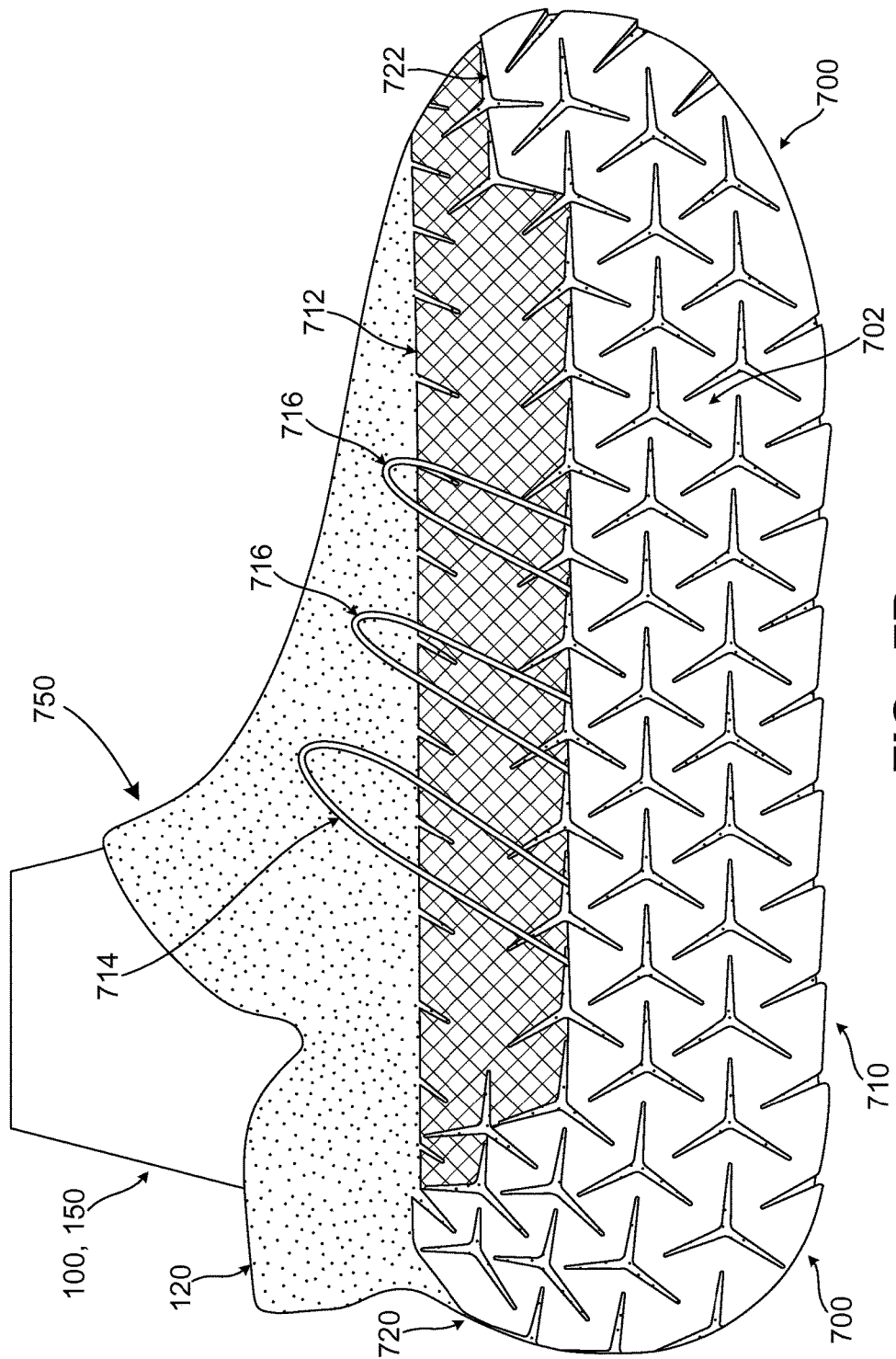

The discussion above relates to footwear component structures and their formation (including one or more upper support members) for engagement with conventional sole structures in a conventional manner. Other options are possible. FIGS. 7A through 7D illustrate an example construction in which a ground engaging sole structure is directly engaged with an upper base member 120 rather than to an upper base component that includes a support member 200, 220, 240, e.g., as shown in the other figures. FIG. 7A shows an example sole component 700 formed as an integral web of generally triangular shaped pods 702 (e.g., in a tessellated configuration). Sole structures of this type also are described in U.S. patent application Ser. No. 14/030,002, entitled "Auxetic Structures and Footwear Soles Having Auxetic Structures", filed Sep. 18, 2013, which application is entirely incorporated herein by reference. This sole structure 700 may be made from a thermoplastic polyurethane, rubber, or other suitable material, optionally at least partially coated with a bonding or adhesive material (e.g., hot melt adhesive material) on one surface (which will contact the upper base member 120 in use). Because of the cutout material areas 704 between adjacent triangular pods 702, this web of material can be made to have a very flexible overall construction (e.g., flexible or foldable in various different directions along aligned segments 706 of cutout material 704), particularly if the pods 702 also are made from a flexible material. The web also can be cut into pieces to form any desired overall size and/or shape of web material. Webs and/or pods 702 of other shapes and constructions also may be used without departing from this invention.

Figure 7C:
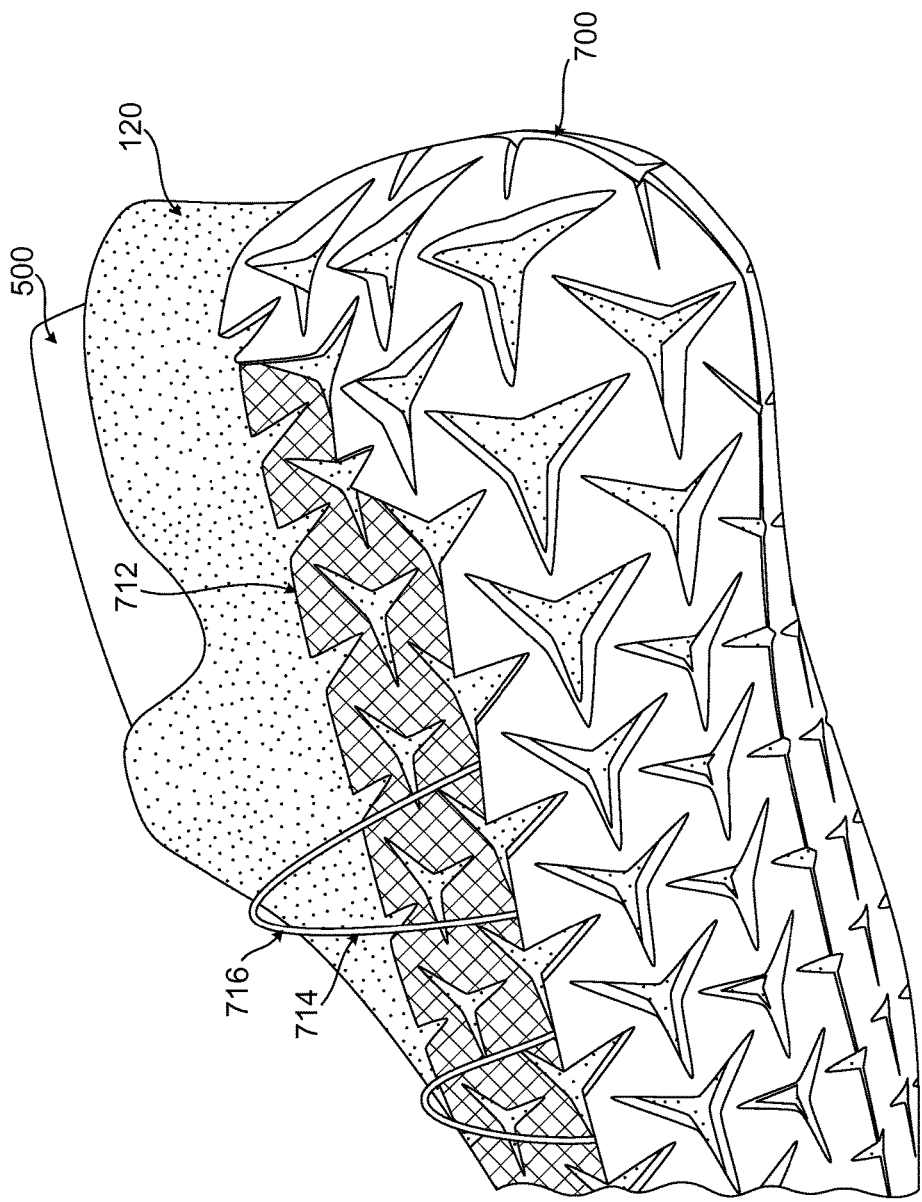
Figure 7D:
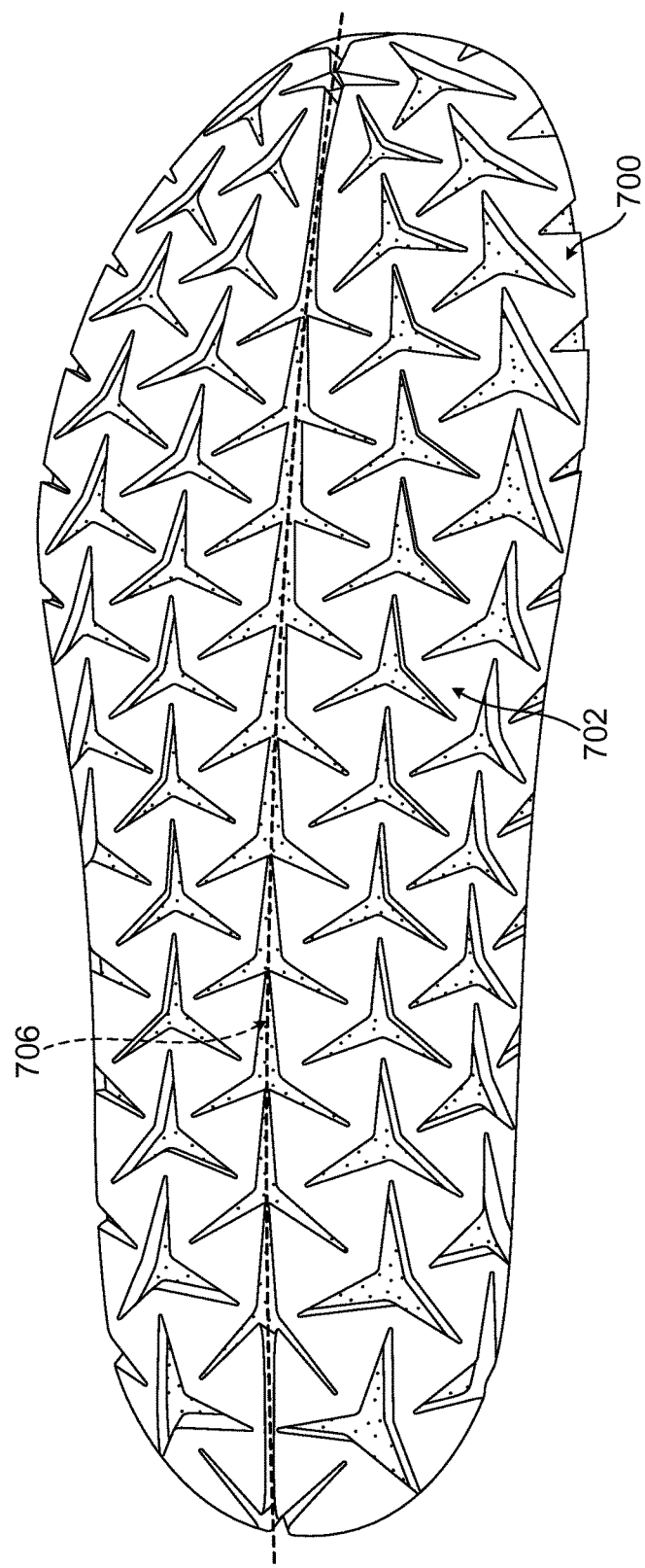

FIGS. 7B through 7D illustrate portions of this web sole structure 700 engaged with an upper base member 120, e.g., by a substantially flat, hot-pressing process, optionally on a jig 100, 150, like the processes described above in conjunction with FIGS. 3 and 4. In this process, one of the aligned segments 706 of cutout material 704 was placed so as to align along the bottom edge 710 of the upper base member 120 and the jig 100, 150 so that the sole structure 700 wrapped around the bottom edge 710 and laid substantially flat on the opposite sides of the upper base member 120. The specific example of FIGS. 7B and 7C further shows a substantially flat upper support member 712 engaged with the upper base member 120, e.g., for providing shape or support for the sides of the final footwear component. If desired, the upper support member 712 and the sole structure 700 may overlap and/or may be applied to the upper base member 120 in a single flat pressing step. Substantially inelastic strands 714 also are provided, optionally with looped or closed free ends (716), for wrapping around the sides and/or bottom of the foot and/or supporting a lace or other type closure system.

The overall combination 750 shown in FIG. 7B (e.g., jig 100, 150, upper base member 120, upper support(s) 712 (if any), and sole structure 700) can be pressed together, e.g., in a process like those described in conjunction with FIGS. 3 and 4, to engage the upper support(s) 712 (if any) and/or sole structure 700 with an exterior surface of the upper base member 120, e.g., using a hot melt adhesive. Then, if desired, as shown in FIGS. 7C and 7D, the combined upper base member 120, upper support(s) 712 (if any), and sole structure 700 may be engaged over a base support 500 for further shaping (e.g., using thermoplastic or thermosetting properties, using shape memory materials, etc., the shape of at least some portion(s) of the upper component may be temporarily or permanently modified). As further shown in FIGS. 7B-7D, the sole member 700 in this illustrated example wraps around the side and rear heel areas 720 to provide additional support for the heel (e.g., akin to a type of heel counter construction) and extends upward at the forward toe area 722 to provide additional stiffness or structure around the toe area. If desired, at least some areas of the sole member 700 may be somewhat thicker (e.g., include a foam material), e.g., to provide impact force attenuation properties.

The combined upper base member 120, upper support(s) 712 (if any), and sole structure 700 may be worn directly as an article of footwear, for example, if exterior surfaces of at least some of the pod areas 702 of the sole structure 700 are formed to include a material suitable for use as a ground-contacting surface (e.g., having sufficient wear resistance, traction characteristics, and the like to function in a desired manner for contacting the ground). Alternatively, if desired, other sole components may be engaged with one or more of the pod areas 702 of the sole structure 700, such as one or more outsole components (e.g., rubber, thermoplastic polyurethanes, etc.); one or more traction elements (e.g., cleats or spikes, bases for mounting cleats or spikes, etc.); etc. The additional sole component(s), when present, may be engaged with the sole structure 700 or other footwear component(s) in conventional manners as are known or used in the art, such as by bonding (using adhesives or cements), by mechanical connectors, by sewing or stitching, etc.

The processes described above in conjunction with FIG. 4 utilized a substantially flat jig 100, 150 to which a single piece upper base member 120 (e.g., a sock or sock-type structure) was applied. At least one single piece support member 200, 220, 240 was wrapped around a bottom 120c of the upper base member 120 (akin to a taco shell) to lie adjacent the opposing flat sides of the upper base member 120. Other options are possible. For example, for at least some materials, after pressing, a permanent crease is formed at the bottom of the upper base member 120 and/or the support member 200, 220, 240 (at the location of the fold). This crease can be undesirable (e.g., aesthetically displeasing, uncomfortable feeling to the bottom of the foot, adversely impacting bonding with other footwear components, etc.). Various ways of avoiding the issues created by this crease may be used in some methods according to this invention. For example, if possible, additional heat and/or pressure may be applied to the creased area over a flat or rounded surface to eliminate or reduce the severity of the crease (e.g., akin to ironing out the crease). As other examples, the underlying sole component (e.g., midsole foam) may be formed to include a sufficiently soft plantar support surface and/or with a corresponding groove in the plantar support surface (to accommodate the fold line) so that the crease is not substantially felt by the wearer. If desired, an underlying sole component of this type (with a soft plantar support surface and/or groove) could be used to moderate the feel of inelastic strands (if any) that extend beneath the foot, like those shown in FIG. 2A, and particularly looped inelastic strands like those shown in FIG. 6B.

Alternatively, rather than a wrapped "taco-like" configuration, one or more separate support members 200, 220, 240 may be applied to each side of the upper base member 120 in a manner so that none of the support members extends continuously around the bottom edge of the jig 100, 150 and/or the upper base member 120. For example, FIG. 2B illustrates an alternative configuration of a two-piece support member 220 in broken lines in which the bottom area 206 of support member 220 is separated or cut to form a lateral side of the support member 220 (including free edge 206L at the bottom area 206) separated from a medial side of the support member 220 (including free edge 206M at the bottom area).

Then, returning to the processes described in conjunction with FIG. 4, rather than folding and positioning a support member 200, 220, 240 to lie along and extend continuously across the top surface of the jigs in the orientation shown in FIG. 4, separate support members can be used. More specifically, as one example, the lateral side of support member 220 and the separate medial side of support member 220 shown in FIG. 2B), with their bonding or adhesive material containing sides oriented upward, may be releasably and temporarily fixed to the exposed surfaces 402a of pressure plates 402. This releasable and temporary engagement of the support members 220 to the pressure plate surfaces 402a may be accomplished in any desired manner, for example, using a light adhesive, electrostatic charge, vacuum attachment, or the like (e.g., any method providing sufficient holding force to hold the support members 220 in position with respect to the pressure plate surface 402a during transport (e.g., from Station 1 to Station 2) and/or while the pressure plates 402 move to engage against the sides of upper base member 120). In this manner, because the support members 220 do not extend continuously and wrap around the bottom edge of the upper base member 120 and the jig, the heating and pressure applying steps will not produce a crease or fold line on the support member(s) 220. In such constructions, the upper base member 120 may be made from a material (such as a fabric or textile) such that the crease can be removed (e.g., by steaming or ironing) and/or such that the fold line is sufficiently flexible and thin that it does not produce an adverse feel on the bottom of the foot. Also, if the support members 220 extend to locations close to this central line of the bottom edge, the elevation provided by the closely adjacent support members 220 along the central line of the bottom edge may accommodate the crease and negate the feel of the fabric crease (if any) in the bottom of the upper base member 120.

In this example production process, the lateral side support member and the medial side support member (e.g., the opposite sides of two-piece support member 220) may be oriented with respect to the upper base member 120 and/or jig 100, 150 so that at least a portion of their edges 206L and 206M are positioned close to the bottom edge 120c of the upper base member 120 and/or close to the bottom edge of jig 100, 150. As some more specific examples, the separate sides of the support member 220 may be positioned such that, when the composite upper base member 120 and support member 220 is formed, at least a portion of lateral edge 206L will be located a distance of 1 inch or less from at least a portion of the medial edge 206M (and in some examples, this edge separation distance may be ½ inch or less or even ¼ or less) over at least some portion of the bottom plantar support surface of the upper base member 120.

As noted above, some aspects of this invention relate to footwear components made from lightweight textile structures that are selectively supported at various areas to provide desired local characteristics, as well as to methods of making such components. The embodiments of the invention described in FIGS. 1A-7D describe various pressing methods of making footwear components using a sock or sock-type structure as an upper base member. The use of a sock or sock-type structure as the upper base member is advantageous because of the soft, flexible, and conforming fit and feel provided by conventional sock and sock-type structures (e.g., circular knitted fabric components made from natural and/or synthetic fiber containing materials, optionally having a closed toe end and an open end for inserting the foot) and because such structures eliminate various other processing steps, such as engagement of the upper with a strobel or bottom, plantar support surface and/or other sewing steps (e.g., to close the bottom and/or heel area of the upper).

Figure 8A:
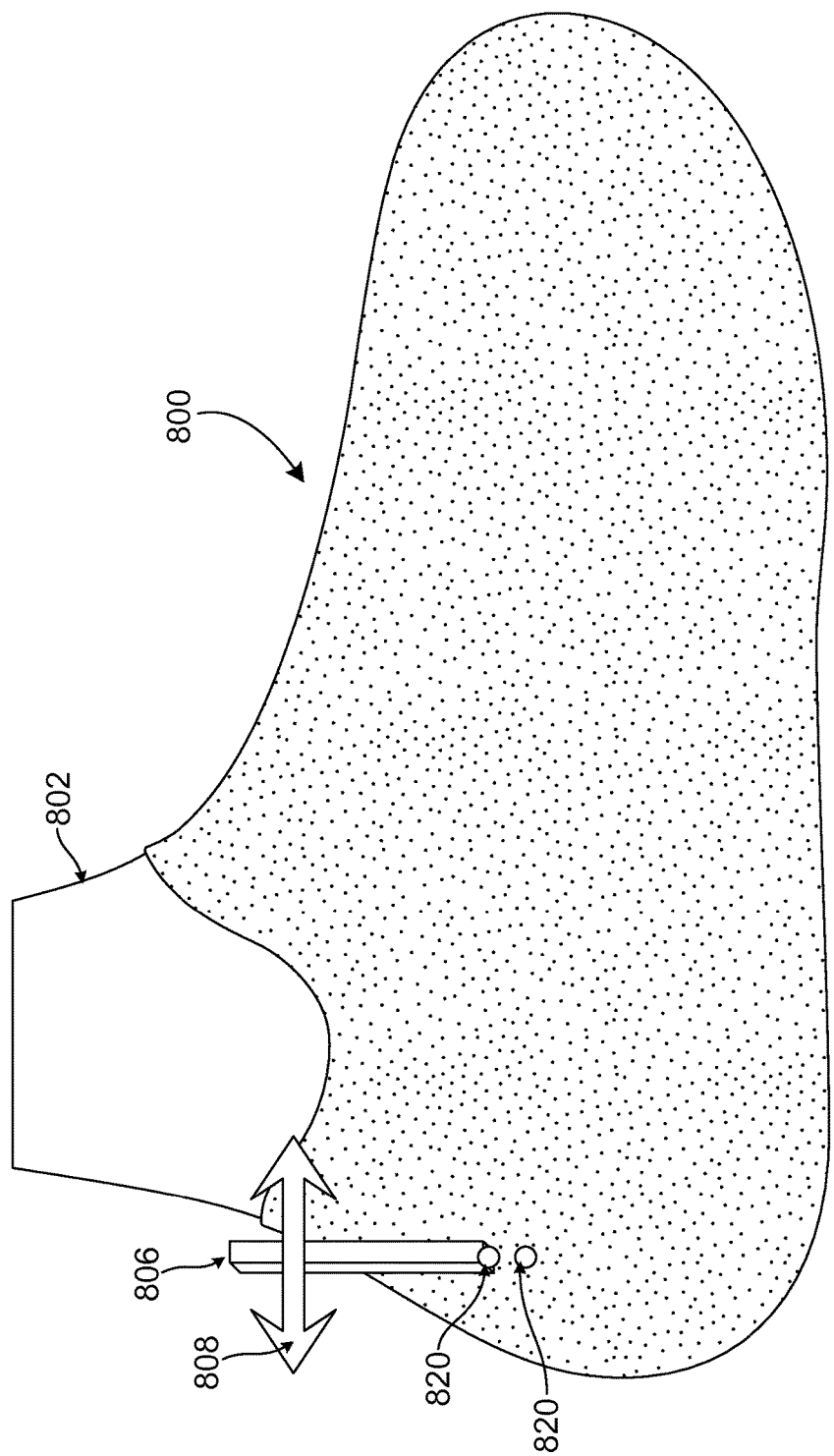
FIGS. 8A-8D illustrate various features and steps for creating a footwear component using reactive polymeric materials in accordance with some examples of this invention.
Figure 8B:
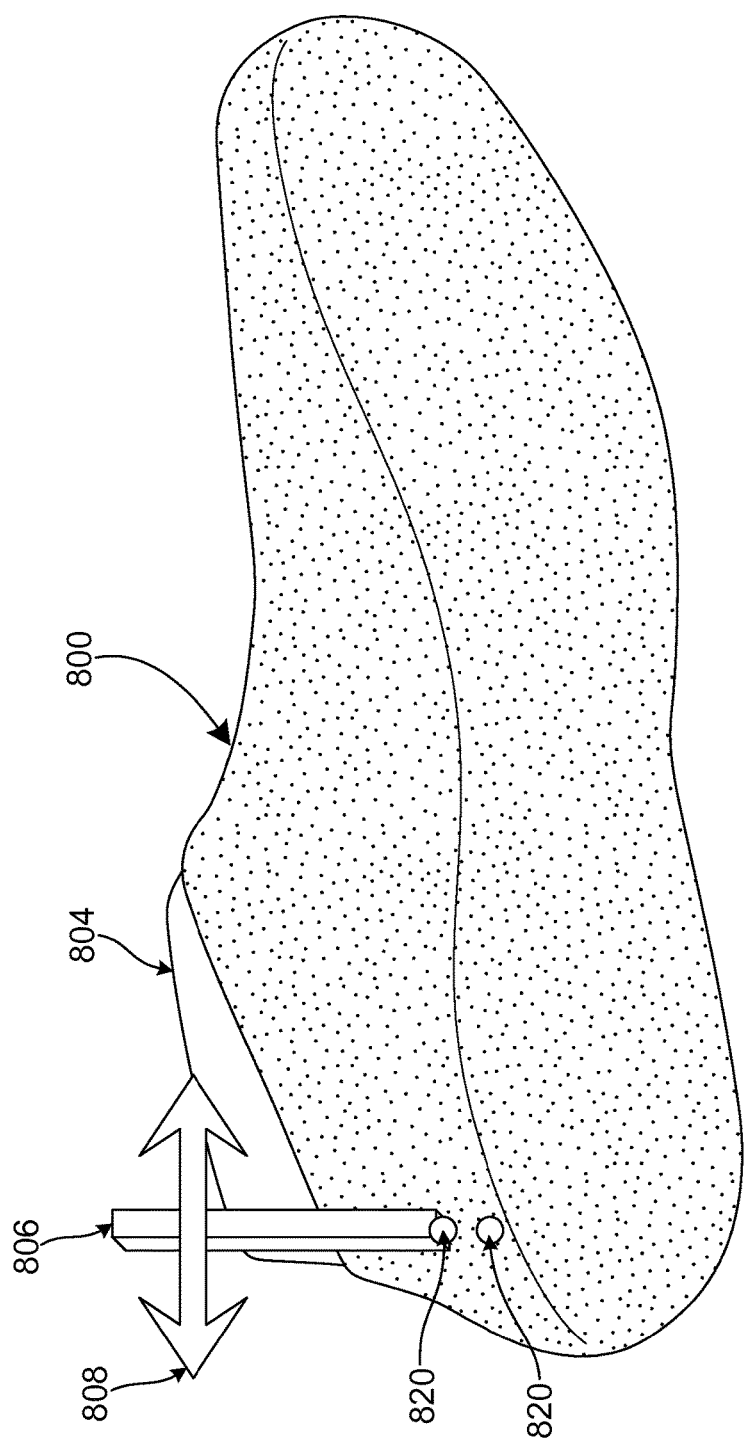

Additional aspects of this invention relate to other ways of providing a footwear component using sock and sock-type structures as an upper base member. One specific example relates to the use of certain reactive polymeric materials to provide shape, support, hardness, and/or stiffness to one or more predetermined localized areas of a sock or sock-type upper base member. For example, as shown in FIGS. 8A and 8B, starting with a sock or sock-type upper base member 800, a reactive polymeric material 820 may be applied to a surface (e.g., the exterior surface) of the upper base member 800. This may be accomplished, for example, with the upper base member 800 in a flat condition (FIG. 8A, e.g., on a flat jig type structure 802) or in a more shaped, three-dimensional condition (FIG. 8B, e.g., on a base support 804, optionally a base support having an exterior surface shaped as the desired shape of at least a portion of the final footwear component).

Any desired curable, reactive polymeric materials 820 may be used without departing from this invention. In some more specific examples of this invention, reactive polymeric materials 820 will be used that exhibit the following characteristics: the reactive polymeric material(s) 820 will have thermoplastic properties as long as it is maintained below a certain temperature (e.g., the material will become soft, pliable, and easily deformable when heated), but after it is heated above a certain temperature optionally for a sufficient time period, the reactive polymeric material will "cure" and harden in an irreversible manner (e.g., by forming cross links, such as ester bond cross links). As some more specific examples, the reactive polymeric material(s) 820 may include a water-based reactive polymer solution, and in some examples, the reactive polymeric material(s) 820 may include an acrylic acid copolymer and a cross-linking agent.

In some embodiments of this invention, the reactive polymeric material(s) 820 will include a polymeric binder material free of formaldehyde, phenols, and isocyanates. As a specific example, reactive polymeric materials 820 that may be used in at least some examples of this invention are available from BASF Corporation under the trademark ACRODUR®.

Figure 8C:
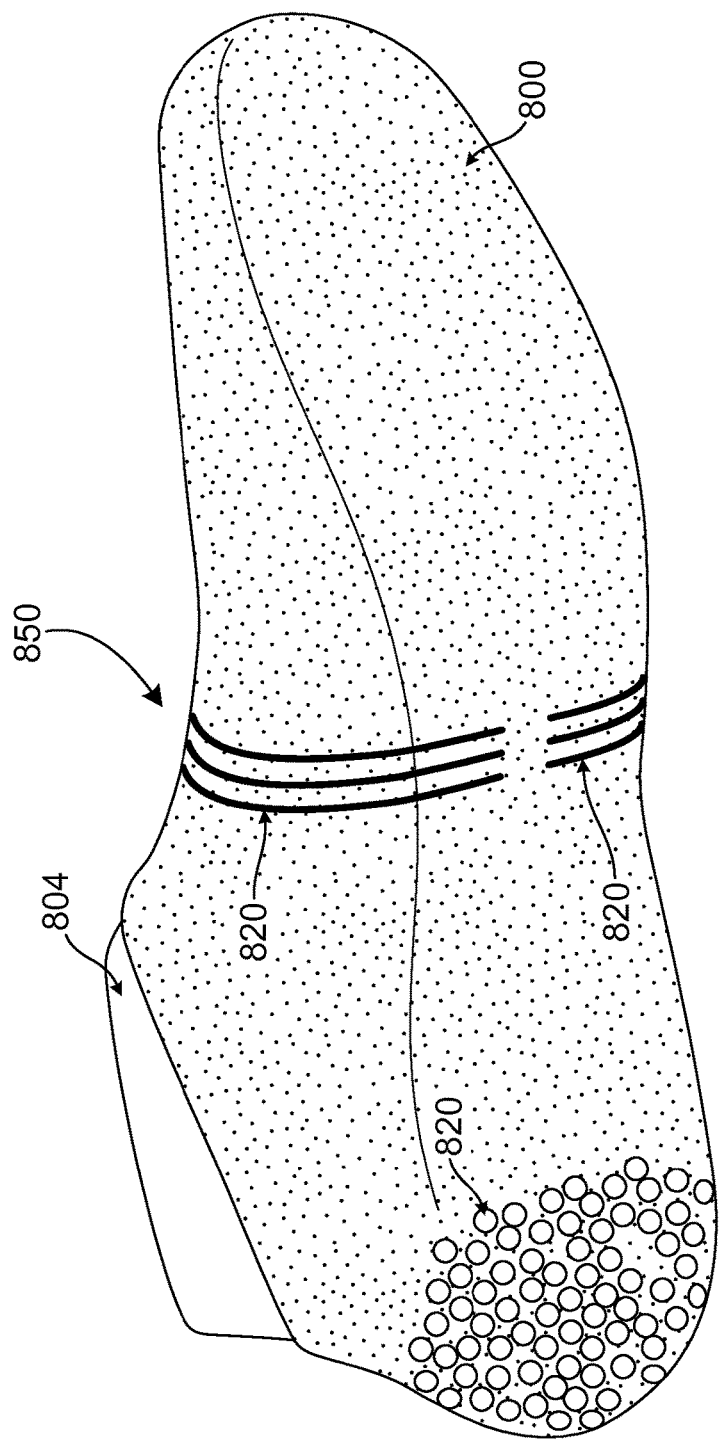
Figure 8D:
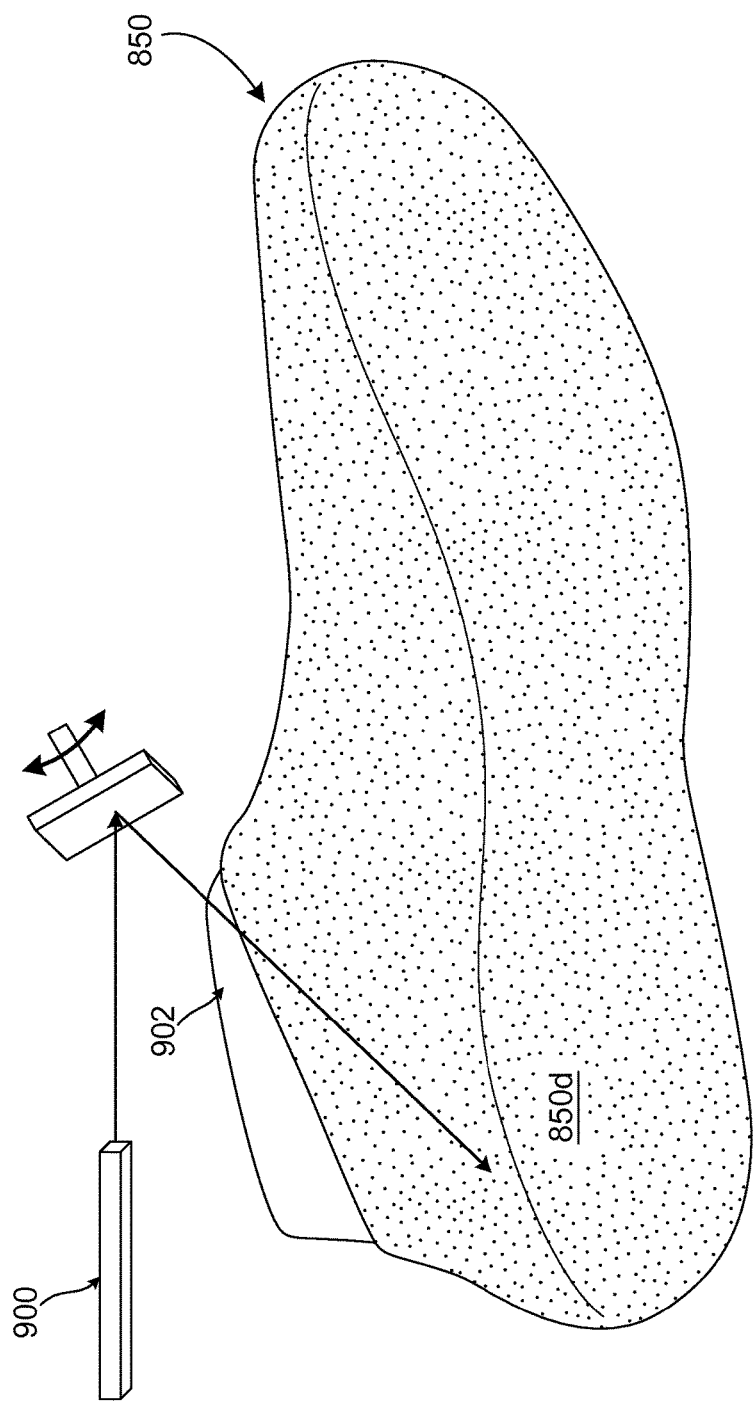

The reactive polymeric material(s) 820 may be applied to the upper base member 800 in any desired manner without departing from general aspects of this invention. In some more specific examples of this invention, however, e.g., as shown in FIGS. 8A-8C, the reactive polymeric material 820 may be selectively applied only to local areas of the upper base member 800 where stiffening, hardening, and/or additional support is desired in the upper base member 800. While other selective application techniques are possible, in these illustrated examples, the reactive polymeric material 820 is applied to the upper base member 800 as a series of relatively small dots (of any desired shape) or segments (e.g., straight or curved line segments) at predetermined areas of the upper base member 800 by a printing process (as shown by the movable print head 806 member in FIGS. 8A and 8B). Any desired process may be used to selectively apply the reactive polymeric material 820 to areas of the upper base member 800, such as printing (e.g., screen printing, jet printing, etc.); by masking techniques (e.g., masking areas of the upper base member 800 to apply the reactive polymeric material only to desired locations); by spraying techniques; by coating techniques; etc.

In the example of FIGS. 8A and 8B, the print head 806 moves to selected areas of the upper base member 800 (shown by arrow 808) and applies small "dots" or "segments" of reactive polymeric material 820 to the predetermined desired areas at a predetermined desired "application density level" (e.g., a predetermined amount of reactive polymeric material (e.g., grams) per unit area (e.g., cm$^2$) or volume (cm$^3$) of the upper base member 800). While the applied dots or segments may overlap one another, this is not a requirement. FIG. 8C shows an example upper base member 800 with both dots (e.g., at the heel area) and segments (at the midfoot area) of reactive polymeric material 820 applied to it (the combination of an upper base member 800 with one or more areas of uncured reactive polymeric material 820 applied to it is represented by reference number 850 in FIG. 8C). Spacing between dots and/or segments, dot and/or segment dimensions, and/or the like, also may be used to control the application density level. Reactive polymeric material applications processes in accordance with examples of this invention may coat individual fibers of the textile upper base member 800 (or portions thereof) and/or fill interstitial areas between fibers of the textile base member with the reactive polymeric material 820.

Also, as is apparent from FIG. 8C, any desired number of separated areas of reactive polymeric material 820 may be applied to an upper base member 800 without departing from this invention. As some more specific examples, the reactive polymeric material 820 may be applied (and eventually cured): over at least a portion of a bottom surface of the upper base member (e.g., to form a support plate for supporting all or some portion(s) of the plantar surface of a wearer's foot and/or for supporting a cleat or other sole component); at an area around one or more sides and/or rear heel area of a wearer's foot (e.g., to provide a heel counter type structure); at an area around the sides or instep of a wearer's foot (e.g., to provide shape support to the upper); at a toe area (e.g., to provide a more defined toe box); along the instep area to provide supports for a shoe lace (e.g., extending in a top-to-bottom direction of the upper base member at a medial or lateral side of the instep area); etc. The same or different reactive polymeric materials 820 and/or application density levels may be used on different areas of a single upper base member 800 (e.g., optionally with different reactive polymeric materials at different areas) without departing from this invention.

If desired, once the reactive polymeric material 820 is applied to the upper base member 800, the so-treated upper base member/uncured reactive polymeric material combination 850 can be removed from any support member (e.g., element 802 or 804) and stored until further processing is desired (e.g., footwear production as will be explained in more detail below). If desired, uncured, reactive polymeric material treated upper base members 850 (e.g., as shown in FIG. 8C, after any necessary drying) may be stored for an extended period of time (days, weeks, months, etc.). In this manner, a large bulk of footwear components (e.g., uncured, reactive polymeric material treated upper base members 850) may be produced and stored, and these components can then be available for further production as desired or needed. A single "uncured" component of this type may be produced and used for producing a wide variety of different finally "cured" component parts (e.g., depending on the upper properties desired, depending on user preferences, depending on commercial demand, etc.), including component parts over a range of sizes (e.g., due to stretchability of the textile portion of component 850). For example, because the treated upper base member 850 may have some flexibility and stretchability (e.g., because of the sock-type construction of the upper base member 800), a single sized treated upper base member 850 may be used for a range of final footwear sizes (e.g., for a range of 2-6 conventional shoe sizes in length and/or for a range of 2-6 conventional shoe sizes in width, and in some examples, for a range of 2-4 conventional shoe sizes in length and/or for a range of 2-4 conventional shoe sizes in width).

When production of a footwear component is desired, as one step, an uncured, reactive polymeric material treated upper base member 850 (e.g., as shown in FIG. 8C) may be applied to a support base 804 having a desired shape for the final footwear component. At some point during this step, if necessary, the assembly shown in FIG. 8C may be heated to a temperature sufficient to take advantage of the thermoplastic properties of the reactive polymeric material 820 and allow the component 850 to be manipulated to a desired shape. The temperature at this shaping stage should be sufficient to allow the component 850 to be shaped due to its thermoplastic properties but insufficient to finally cure the reactive polymeric component, as will be described in more detail below. This type of shaping can occur in any desired manner, for example, by pressing, by pushing/pulling the component 850 against the surface of the support base 804 using vacuum pressure, by hand, etc. Optionally, after this shaping step, the shaped component 850 may be removed from the support base 804 and optionally stored again (with the shaped component 850 retaining its shape and its thermoplastic properties (which can allow the shaped component 850 to be heated, re-shaped, or further shaped in the future, if desired)). Alternatively (or optionally after this additional storing step), during or after any desired shaping step in the thermoplastic condition (if any is needed), the reactive polymeric material 820 may be cured (e.g., by raising the temperature of the finally shaped component 850 above the reactive polymer curing temperature). Curing of this type causes cross linking, e.g., formation of ester cross linking bonds, which converts the reactive polymeric material to a cured, thermoset state (at which the shapes of any cured parts are irreversibly fixed).

As noted above, when an upper base member 800 includes reactive polymeric material 820 in more than one area, the reactive polymeric materials 820 may be the same or different in the different areas. Varying the stiffness and/or hardness properties on different areas of a single upper base member may be accomplished in various manners in accordance with some aspects of this invention. For example, the use of different reactive polymeric materials 820 at different areas may provide varying hardness and/or stiffness at the different areas of the upper base member 800. As some more specific examples, different concentrations of reactive polymeric materials 820 in aqueous solutions may be applied at different areas of the upper base member 800 and/or different "dot" or "segment" spacings and/or sizes may be used at different areas of the upper base member (to thereby alter the "application density levels" (e.g., in $g/cm^2$ and/or $g/cm^3$) of the reactive polymeric material 820 on the upper base member 800.

The above description of FIGS. 8A through 8C relates to constructions and methods in which the reactive polymeric material 820 is applied to predetermined, targeted areas of an upper base member 800 and then all (or substantially all) of the reactive polymeric material 820 on the upper base member 800 may be exposed to curing conditions and cured to a hardened or stiffened (thermoset) state (thereby forming a finally and irreversibly hardened footwear component that may be further processed to a final article of footwear product). Other footwear component production methods and techniques are possible. For example, if desired, the final footwear component may have both cured and uncured reactive polymeric material(s) 820 in or on it. In other words, a greater proportion of the upper base member 800 surface and/or volume may have reactive polymeric material 820 applied to it than the proportion thereof having reactive polymeric material 820 that is eventually cured. This will leave some portion of the reactive polymeric material 820 on the upper base member 800 with thermoplastic properties (and potentially capable of being altered in shape, e.g., upon heating to a temperature below the curing temperature) and some portion of the reactive polymeric material 820 cured and thermoset (and not capable of being altered in shape upon re-heating). The remaining thermoplastic portion also could be cured at a later time, in a separate curing step, if desired.

As some more specific examples, the reactive polymeric material(s) 820 may be applied (e.g., by coating, spraying, printing, etc.) to at least 50% of an overall surface area and/or volume of the upper base member 820 and then only one or more selected portions of this surface area and/or volume (e.g., less than 50% of the overall surface area and/or volume in some examples) will be exposed to effective curing/thermosetting conditions. In some other examples of this invention, at least 50%, at least 65%, at least 75%, at least 90%, or even up to 100% of the surface area and/or volume of the upper base member 800 may have reactive polymeric material applied to it, but less than 95%, less than 90%, less than 75%, less than 65%, or even less than 50% of this overall surface area and/or volume with reactive polymeric material applied to it will then be cured/thermoset. In other words, assume: (a) X is a total exterior surface area and/or volume of the upper base member 800, (b) Y is a total exterior surface area and/or volume of the upper base member 800 to which the reactive polymeric material 820 is applied, and (c) Z is a total exterior surface area and/or volume of the upper base member 800 including reactive polymeric material 820 that is cured/thermoset. Then, $X \geq Y \geq Z$, and any one or more of the following relationships also may exist: (a) Y=0.1X to X, (b) Y=0.25X to X, (c) Y=0.5X to X, (d) Y=0.65X to X, (e) Y=0.75X to X, (f) Y=0.9X to X, (g) Z=0.1Y to Y, (h) Z=0.25Y to Y, (i) Z=0.5Y to Y, (j) Z=0.65Y to Y, (k) Z=0.75Y to Y, and/or (l) Z=0.9Y to Y.

Systems and methods according to examples of this invention may accomplish this "selective exposure" to curing/thermosetting conditions in various ways, such as: by applying an insulative "mask" over areas of the surface at which curing is not desired (so that insufficient heat transfers through the insulative mask during the curing process to cure any reactive polymeric material(s) 820 located behind the mask); by applying a heat conductive "mask" over areas of the surface at which curing is desired (so that sufficient heat quickly transfers through the heat conductive mask to the areas where curing of the reactive polymeric material(s) 820 is desired and completed before the reactive polymeric material 820 in the "unmasked areas" reaches the curing conditions); by using a heated die for heating that selectively applies heat only at desired locations; by selectively heating areas of the surface 850d where curing is desired using laser radiation (such as the scanning laser source 900 shown in FIG. 8D, a heat gun, or other targeted heat applying source); by selectively activating portions of an array of heat elements provided on a base member 902 that supports the treated upper base member 850; by providing a base member 902 having heat elements located at predetermined areas for heating the footwear component 850; etc.

The base member 902 may be shaped so as to hold at least the portions of the footwear component 850 (including the upper base member 800 with the reactive polymeric material 820 applied to it as described above) to be cured in a final desired shape for the curing process (i.e., during curing, the portion of the reactive polymeric material 820 exposed to effective curing conditions will be thermoset and irreversibly maintained in this shape). If necessary or desired, this type of shaping can be assisted, for example, by pressing, by pushing/pulling the component 850 against the surface of the support base 902 using vacuum pressure, etc. Curing may take place in multiple steps, if desired (e.g., with one area of the component 850 cured in one step and one or more other areas of the component 850 cured in one or more other steps).

Similar to the discussion above with respect to FIG. 8C, selectively curing one or more areas of a footwear component 850 in the manner described above with respect to FIG. 8D may cure at any desired number of separated areas on an individual footwear component. As some more specific examples, the reactive polymeric material 820 may be selectively cured: over at least a portion of a bottom surface of the upper base member (e.g., to form a support plate for supporting all or some portion(s) of the plantar surface of a wearer's foot and/or for supporting a cleat or other sole structure component); at an area around one or more sides and/or rear heel area of a wearer's foot (e.g., to provide a heel counter type structure); at an area around the sides or instep of a wearer's foot (e.g., to provide shape support to the upper); at a toe area (e.g., to provide a more defined toe box); along the instep area to provide supports for a shoe lace (e.g., extending in a top-to-bottom direction of the upper base member at a medial or lateral side of the instep area); etc. In some examples of this invention, holes may be formed in and/or hardware may be attached at one or more cured areas of the reactive polymeric material 820 (e.g., in the instep area), and these holes and/or hardware may be used to engage a lace or other footwear securing structure.

Once at least some portion(s) of the footwear component 850 is cured, the footwear component 850 may be used directly as a footwear product in at least some examples of this invention. Alternatively, if desired, the at least partially cured footwear component 850 may be engaged with a sole component for an article of footwear, such as one or more midsole components (e.g., foam midsole components, fluid-filled bladder midsole components, foam column type midsole components, mechanical impact force absorbing structures, etc.); one or more outsole components (e.g., rubber, thermoplastic polyurethanes, etc.); one or more traction elements (e.g., cleats or spikes, bases for mounting cleats or spikes, etc.); etc. These sole component(s) may be engaged with the other footwear component 850 in conventional manners as are known or used in the art, such as by bonding (using adhesives or cements), by mechanical connectors, by sewing or stitching, etc., including by the various methods described above (e.g., in conjunction with FIGS. 5A-7D).

III. CONCLUSION

The present invention is described above and in the accompanying drawings with reference to a variety of example structures, features, elements, and combinations of structures, features, and elements. The purpose served by the disclosure, however, is to provide examples of the various features and concepts related to the invention, not to limit the scope of the invention. One skilled in the relevant art will recognize that numerous variations and modifications may be made to the embodiments described above without departing from the scope of the present invention, as defined by the appended claims. For example, the various features and concepts described above in conjunction with FIGS. 1A through 8D may be used individually and/or in any combination or subcombination without departing from this invention.

I claim:

1. A component for an article of footwear formed from a process comprising:
applying a first reactive polymeric material to a first portion of an upper base member, the first portion of the upper base member including at least a portion of a bottom surface of the upper base member, wherein the first reactive polymeric material exhibits a first set of thermoplastic properties as long as it is not exposed to thermoset curing conditions and thermosetting properties after it is exposed to thermoset curing conditions;
applying a second reactive polymeric material to a second portion of an upper base member, wherein the second reactive polymeric material exhibits a second set of thermoplastic properties as long as it is not exposed to thermoset curing conditions and thermosetting properties after it is exposed to thermoset curing conditions;
exposing the first reactive polymeric material on the first portion of the upper base member to thermoset curing conditions after the first reactive polymeric material is applied to the upper base member so as to convert the first reactive polymeric material at the first portion of the upper base member to a thermoset condition; and
exposing the second reactive polymeric material on the second portion of the upper base member to thermoset curing conditions after the second reactive polymeric material is applied to the upper base member so as to convert the second reactive polymeric material at the second portion of the upper base member to a thermoset condition;
wherein the first reactive polymeric material is different than the second reactive polymeric material, and wherein the component for the article of footwear is a circular knitted body having an open end and a closed end.

2. A component for an article of footwear formed from a process comprising:
applying a first reactive polymeric material to a first portion of an upper base member at a first application density level, the first portion of the upper base member including at least a portion of a bottom surface of the upper base member, wherein the first reactive polymeric material exhibits thermoplastic properties as long as it is not exposed to thermoset curing conditions and thermosetting properties after it is exposed to thermoset curing conditions;
applying a second reactive polymeric material to a second portion of the upper base member at a second application density level, wherein the second reactive polymeric material is different from the first reactive polymeric material and exhibits thermoplastic properties as long as it is not exposed to thermoset curing conditions and thermosetting properties after it is exposed to thermoset curing conditions, wherein the first application density level is greater than the second application density level;
exposing the first reactive polymeric material on the first portion of the upper base member to thermoset curing conditions so as to convert the first reactive polymeric material to a thermoset condition; and
exposing the second reactive polymeric material on the second portion of the upper base member to thermoset curing conditions so as to convert the second reactive polymeric material to a thermoset condition;
wherein the component for the article of footwear is a circular knitted body having an open end and a closed end.

3. A component for an article of footwear, comprising:
an upper base member including a textile material made from natural or synthetic fibers, wherein the upper base member is a circular knitted body having an open end and a closed end; and
a first cured, thermoset polymeric material coating provided in interstitial spaces between individual fibers of a first portion of the upper base member, the first portion of the upper base member including an area that extends from a lateral side of the upper base member, around a rear heel area of the upper base member, and to a medial side of the upper base member, wherein the first cured, thermoset polymeric material is formed at the first portion of the upper base member by curing a reactive polymeric material that was coated and/or was provided in interstitial spaces between individual fibers of the textile material at the first portion of the upper base member, and wherein the first portion of the upper base member has a greater hardness or stiffness as compared to a portion of the textile material that does not include the first cured, thermoset polymeric material;
a second cured, thermoset polymeric material coating provided in interstitial spaces between individual fibers of a second portion of the upper base member, wherein the second cured, thermoset polymeric material is formed at the second portion of the upper base member by curing a reactive polymeric material that was coated and/or was provided in interstitial spaces between individual fibers of the textile material at the second portion of the upper base member, and wherein the second portion of the upper base member has a greater hardness or stiffness as compared to a portion of the textile material that does not include the first or second cured, thermoset polymeric materials;

wherein the first cured, thermoset polymeric material has different hardness characteristics than the second cured, thermoset polymeric material.

4. A component for an article of footwear according to claim 3, wherein the reactive polymeric material includes a member selected from the group of: a water-based reactive polymer; an acrylic acid copolymer and a cross-linking agent; and a polymeric binder material free of formaldehyde, phenols, and isocyanates.

5. A component for an article of footwear according to claim 3, wherein the textile material of the upper base member includes a second portion having uncured reactive polymeric material coating provided in interstitial spaces between individual fibers of the textile material at the second portion of the upper base member, and wherein the second portion of the upper base member has thermoplastic properties.

6. A component for an article of footwear, comprising:
an upper base member including a textile material made from natural or synthetic fibers, wherein the upper base member is a circular knitted body having an open end and a closed end; and a first reactive polymeric material coating having a first application density level and provided in interstitial spaces between individual fibers of a first portion of the upper base member, the first portion of the upper base member including an area extending in a top-to-bottom direction of the upper base member at a medial or lateral side of the instep area, wherein the first reactive polymeric material exhibits thermoplastic properties as long as it is not exposed to thermoset curing conditions and is capable of becoming a first cured, thermoset polymeric material after it is exposed to thermoset curing conditions;

a second reactive polymeric material coating having a second application density level and provided in interstitial spaces between individual fibers of a second portion of the upper base member, wherein the second polymeric material exhibits thermoplastic properties so long as it is not exposed to thermoset curing conditions and is capable of become a second cured, thermoset polymeric material after it is exposed to thermoset curing conditions;

wherein the first cured, thermoset polymeric material has different hardness characteristics than the second cured, thermoset polymeric material, and wherein the first application density level is greater than the second application density level.

* * * * *

UNITED STATES PATENT AND TRADEMARK OFFICE
CERTIFICATE OF CORRECTION

PATENT NO. : 9,861,162 B2
APPLICATION NO. : 14/247981
DATED : January 9, 2018
INVENTOR(S) : Bruce Kilgore It is certified that error appears in the above-identified patent and that said Letters Patent is hereby corrected as shown below:

In the Claims

Column 32, Line 20: Please remove "become" and replace with --becoming--.

Signed and Sealed this
Twenty-seventh Day of March, 2018

Andrei Iancu
*Director of the United States Patent and Trademark Office*